US011627034B1

(12) United States Patent
Chawathe et al.

(10) Patent No.: US 11,627,034 B1
(45) Date of Patent: Apr. 11, 2023

(54) AUTOMATED PROCESSES AND SYSTEMS FOR TROUBLESHOOTING A NETWORK OF AN APPLICATION

(71) Applicant: VMWARE, INC., Palo Alto, CA (US)

(72) Inventors: Rahul Ajit Chawathe, Bangalore (IN); Amarjit Kumar Gupta, Pune (IN); Gyan Sagar Sinha, Pune (IN); Wenxuan Zhou, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/676,266

(22) Filed: Feb. 21, 2022

(30) Foreign Application Priority Data

Jan. 1, 2022 (IN) .............................. 202241000052

(51) Int. Cl.
*H04L 41/22* (2022.01)
*H04L 41/0631* (2022.01)
*H04L 41/5009* (2022.01)
*H04L 43/045* (2022.01)

(52) U.S. Cl.
CPC ............ *H04L 41/064* (2013.01); *H04L 41/22* (2013.01); *H04L 41/5009* (2013.01); *H04L 43/045* (2013.01)

(58) Field of Classification Search
CPC ... H04L 41/054; H04L 41/22; H04L 41/5009; H04L 43/045; H04L 41/064
USPC ................ 709/220, 224, 226, 228
See application file for complete search history.

(56) References Cited

U.S. PATENT DOCUMENTS

| | | | | |
|---|---|---|---|---|
| 10,452,444 B1* | 10/2019 | Jibaja | ..................... | G06F 3/0665 |
| 11,455,168 B1* | 9/2022 | Potyraj | ................... | G06F 9/3877 |
| 2005/0172306 A1* | 8/2005 | Agarwal | ............... | G06F 11/008 |
| | | | | 714/E11.207 |
| 2006/0101308 A1* | 5/2006 | Agarwal | ............... | G06F 11/079 |
| | | | | 714/25 |
| 2009/0281845 A1* | 11/2009 | Fukuda | ............ | G06Q 10/06393 |
| | | | | 705/7.39 |
| 2013/0091683 A1* | 4/2013 | Gradel | ................... | A61F 2/4609 |
| | | | | 29/428 |
| 2016/0308726 A1* | 10/2016 | Dennis | ................... | H04L 67/148 |
| 2017/0250880 A1* | 8/2017 | Akens | ................... | H04L 43/045 |
| 2018/0032941 A1* | 2/2018 | Naous | ............... | G06Q 10/06393 |
| 2018/0033017 A1* | 2/2018 | Gopalakrishnan Iyer | .................... | |
| | | | | G06N 5/003 |
| 2018/0034685 A1* | 2/2018 | Naous | ................... | H04L 41/064 |
| 2019/0121673 A1* | 4/2019 | Gold | ..................... | G06F 3/0608 |
| 2020/0164402 A1* | 5/2020 | Hillman | ................... | B05D 1/32 |
| 2020/0174630 A1* | 6/2020 | Rosenberg | .............. | G06F 3/013 |
| 2021/0152416 A1* | 5/2021 | A | .......................... | H04L 41/069 |

FOREIGN PATENT DOCUMENTS

EP  3051421 A1 * 8/2016 .......... G06F 11/0706

* cited by examiner

*Primary Examiner* — Khanh Q Dinh

(57) ABSTRACT

Automated computer-implemented processes and systems are directed to troubleshooting a network used by an application in a data center. The processes and system execute a framework for automated network troubleshooting of an application. The framework performs automated fault localization by traversing a dependency graph that models the network from the observed performance problem, guided by the causality relationships, and for each edge of the graph, performs a test to determine problem causality, terminates at a set of well-defined criteria, and outputs at least one potential root cause for the application performance problem.

21 Claims, 36 Drawing Sheets

| VMs | | | | |
|---|---|---|---|---|
| App01 | TROUBLESHOOT | | | |
| Manager vc-north.host1.local | Logical Switches App01-App | IP Address aaa.bb.cc.20 | Datastores IT-Unity-Storage | Host w1-vmi-tmm-esx001.host1 |
| App02 | TROUBLESHOOT | ALERT: Application latency is unacceptable △ —1804 | | |
| Manager vc-north.host1.local | Logical Switches App01-App | IP Address aaa.bb.cc.21 | Datastores IT-Unity-Storage | Host w1-vmi-tmm-esx002.host1 |
| App03 | TROUBLESHOOT | | | |
| Manager vc-north.host1.local | Logical Switches App02-App | IP Address aaa.bb.dd.21 | Datastores IT-Unity-Storage | Host w1-vmi-tmm-esx003.host1 |
| App04 | TROUBLESHOOT | | | |
| Manager vc-north.host2.local | Logical Switches App02-App | IP Address aaa.bb.dd.23 | Datastores IT-Unity-Storage | Host w1-vmi-tmm-esx003.host2 |
| Edge-gateway-VM05 | TROUBLESHOOT | | | |
| Manager vc-north.host2.local | Logical Switches App02-App | IP Address aaa.bb.ee.24 | Datastores IT-Unity-Storage | Host w1-vmi-tmm-esx004.host2 |

FIG. 18

| Dependency 2002 | Examples 2006 |
|---|---|
| Application → Network Element | • NSX Edge packet drops causing decrease in application throughput<br>• Packet drops at VM decrease application throughput<br>• Application latency increased due to traffic overload on VM |
| Application → Compute Element | • Application performance affected by virtual order CPU load<br>• VM CPU bottleneck slows down the application |
| Network Element → Traffic | • Packet drops at router caused by sudden increase in traffic<br>• Sudden traffic burst of traffic caused by elephant flows |
| Network Element → Network Element Peers | • Traffic overload on router due to failure of peer router in Equal Cost Multi Path (ECMP) configuration<br>• Traffic overload on link due to failure of other links in Link Aggregation Group (LAG) |
| Network Element → Compute Element | • Traffic drop at NSX Edge explained by CPU bottleneck |
| Compute Element → Compute Element Peers | • CPU Overload on a web server due to other servers in the load balanced pool going down |
| Compute Element → Host | • Issues in VM explained by issues in Host containing the VM |
| Compute Element → Network Source | • CPU overload in VM explained by increased traffic load |
| Traffic → Traffic Source (Compute Element) | • An elephant flow could have started after the source VM's OS upgrade<br>• Traffic source could be a rogue source such as DoS attack |
| Host → Compute Element | • Overload issues in host could be explained by certain VMs hogging the resources |

FIG. 20

| Node Type | Examples | Metrics | Alerts |
|---|---|---|---|
| Application 2104 | • Application | • Latency<br>• Throughput<br>• Error Rate | • Latency high<br>• Throughput low<br>• Error Rate high |
| Network Element 2105 | • Transit (Physical/Virtual) (Switch, Load Balancer, Firewall)<br>• Endpoint (Physical/Virtual) (Switch, Load Balancer, Firewall) | • Traffic Rate<br>• Traffic Drop Rate | • Link Down<br>• Routing change<br>• Firewall rule changed |
| Compute Element 2106 | • Transit (vCPU for Virtual Switch (NSX Edge))<br>• Endpoint (VM, Kubernetes Pod, Bare-metal) | • vCPU Usage<br>• vMemory Usage | • OS upgrade<br>• Change event |
| Host 2107 | • Server computer | • CPU Usage<br>• Memory Usage<br>• Disk Usage | • OS upgrade<br>• Change event |
| Traffic Flow 2108 | • Transit Traffic<br>• Traffic generated by/arriving at Endpoint | • Flow Rate | |

FIG. 21

AUTOMATED PROCESSES AND SYSTEMS FOR TROUBLESHOOTING A NETWORK OF AN APPLICATION

RELATED APPLICATION

Benefit is claimed under 35 U.S.C. 119(a)-(d) to Foreign Application Serial No. 202241000052 filed in India entitled "AUTOMATED PROCESSES AND SYSTEMS FOR TROUBLESHOOTING A NETWORK OF AN APPLICATION", on Jan. 1, 2022, by VMware, Inc., which is herein incorporated in its entirety by reference for all purposes.

TECHNICAL FIELD

This disclosure is directed to processes and systems that troubleshoot networks in a distributed computing system.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands of components that provide enormous computational bandwidths and data-storage capacities. These large, distributed computing systems are maintained by cloud-computing providers in data centers and are made possible by advances in virtualization, computer networking, distributed operating systems and applications, data-storage appliances, computer hardware, and software technologies.

Data centers execute a multitude of applications in virtual environments that enable businesses, governments, and other organizations to offer a variety of services over the internet. Virtualization has enabled many organizations to avoid expensive investments in building and maintaining private physical computing infrastructures. Virtualization enables the creation of software-based, or virtual, representations of server computers, data-storage devices, and networks that can be scaled up or down to meet varying demands for services. For example, a virtual computer system, also known as a virtual machine ("VM"), is a self-contained application and operating system implemented in software. Software components of a distributed application are often run in separate VMs, which enables flexibility in responding to changes in demand for services and addressing infrastructure problems. For example, when a host of a VM fails, the VM is migrated to another host. When demand for a service increase, VMs that provide that service may be cloned and run on other hosts to meet the increased demand. On the other hand, when the demand for a service decreases, the number of VMs that provide the service may be reduced to avoid running idle VMs and free up physical resources. Network virtualization has enabled the creation, provisioning, and management of virtual networks implemented in software as logical networking devices, such as logical ports, logical switches, logical routers, logical firewalls, logical load balancers, and virtual private networks ("VPNs"). Network virtualization allows applications and VMs to run on a virtual network and has enabled the creation of software-defined, or virtual, data centers that run on the physical resources of a physical data center. These advancements in virtualization and data center technologies allow organizations the flexibility of purchasing computing services and data storage as needed in much the same way utility customers purchase services from public utilities.

The size and complexity of data centers have grown to meet the demands of an increasing number of organizations that have moved critical applications to the cloud. A critical application is essential for an organization to provide services, web services, and other cloud services to millions of users each day. Organizations focus a great deal of their attention on ensuring the availability and reliable performance of critical applications. However, large-scale network infrastructures of data centers that support critical applications have become increasingly complex and, therefore, are difficult to monitor and troubleshoot for a root cause of problem. Problems that occur in a network an application runs on leads to degradation of the application over time, mistakes in processing transactions, and denying people access to services provided by an organization. Software engineers and system administrators rely on conventional network management tools to generate information that can be used with manual workflows and domain expertise to reveal specific network problems. However, the troubleshooting process is error-prone and can take days, weeks, and, in some extreme cases, months to detect a network problem. Conventional approaches for localizing a network fault operate within silos of the network. For example, siloed network monitoring approaches either perform deep packet inspection or perform IT infrastructure management. Both approaches are performed in isolation, do not have full access to the network, and are not able to isolate an application performance problem to a specific network fault.

Long periods spent troubleshooting a network problem leads directly to increased cost for an organization, continued mistakes in processing transactions or providing services, and continued denial of access to services provided by an organization. Therefore, it is crucial to determine the root cause and localize the network fault as soon as possible, within minutes, if not seconds. On the other hand, it should be possible to rapidly establish the innocence of the network, thereby freeing up software engineers to focus their attention on troubleshooting the application itself. Datacenter administrators and application owners seek automated processes and systems that reduce the time to troubleshoot a network performance problem or rapidly establish the innocence of the network.

SUMMARY

Automated computer-implemented processes and systems described herein are directed to troubleshooting a network used by an application running in a data center. The processes and system execute a framework for automated network troubleshooting of an application ("FANTA"). FANTA provides one-click network fault localization in the application context and reduces mean time to resolution of the problem from hours or days to just minutes. FANTA takes as input a dependency graph that models a network of various entities in the data center that communicate with the application over the data center network. The dependency graph specifies potential causality relationships between metrics and alerts of the various entities. FANTA performs automated fault localization by traversing the dependency graph from an observed symptom of a performance problem. The traversal of the dependency graph is guided by the causality relationships between metrics and alerts. For each edge of the dependency graph, FANTA performs a test to determine problem causality, terminates at a set of well-defined criteria, and outputs at least one potential root cause for the performance problem with the application.

DESCRIPTION OF THE DRAWINGS

FIG. 18 shows an example graphical user interface ("GUI") that displays a list of applications.

FIG. 20 shows a table of problems associated with edges of the dependency graph in FIG. 19A.

FIG. 21 shows a table of node types, metrics, and alerts associated with the nodes the dependency graph in FIG. 19A.

DETAILED DESCRIPTION

This disclosure presents automated computer-implemented processes and systems for troubleshooting a network used by applications running in a data center. In the first subsection, computer hardware, complex computational systems, and virtualization are described. Network virtualization is described in the second subsection. Automated computer-implemented processes and systems for troubleshooting a network used by an application running in a data center are described below in the third subsection.

Computer Hardware, Complex Computational Systems, and Virtualization

The term "abstraction" does not mean or suggest an abstract idea or concept. Computational abstractions are tangible, physical interfaces that are implemented using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. Software is a sequence of encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices. Multi-cloud aggregations, cloud-computing services, virtual-machine containers and virtual machines, containers, communications interfaces, and many of the other topics discussed below are tangible, physical components of physical, electro-optical-mechanical computer systems.

Figure 1:
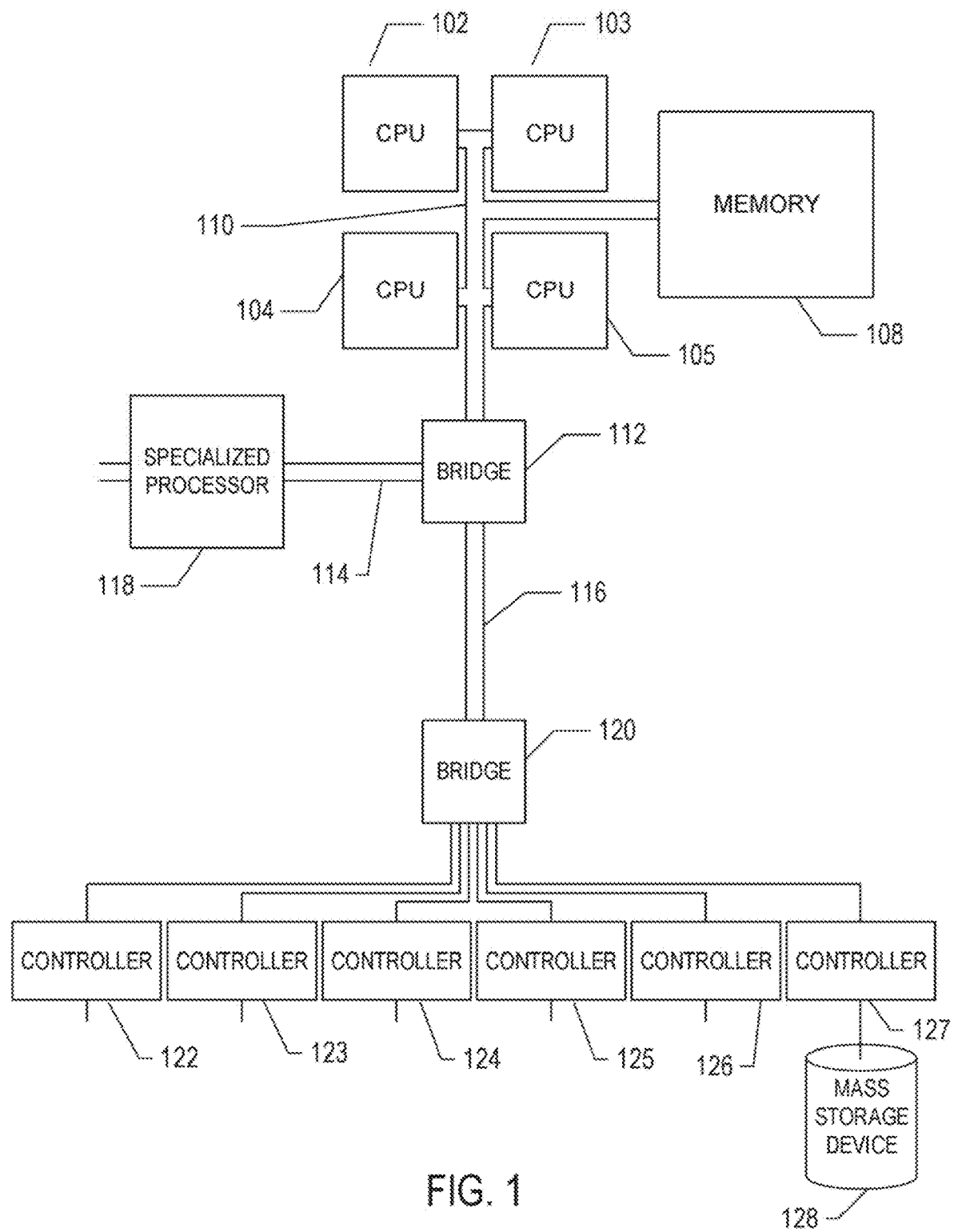
FIG. 1 shows an architectural diagram for various types of computers.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, computer-system architectures differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of server computers and workstations, and higher-end mainframe computers, but may also include a plethora of various types of special-purpose computing devices, including data-storage systems, communications routers, network nodes, tablet computers, and mobile telephones.

Figure 2:
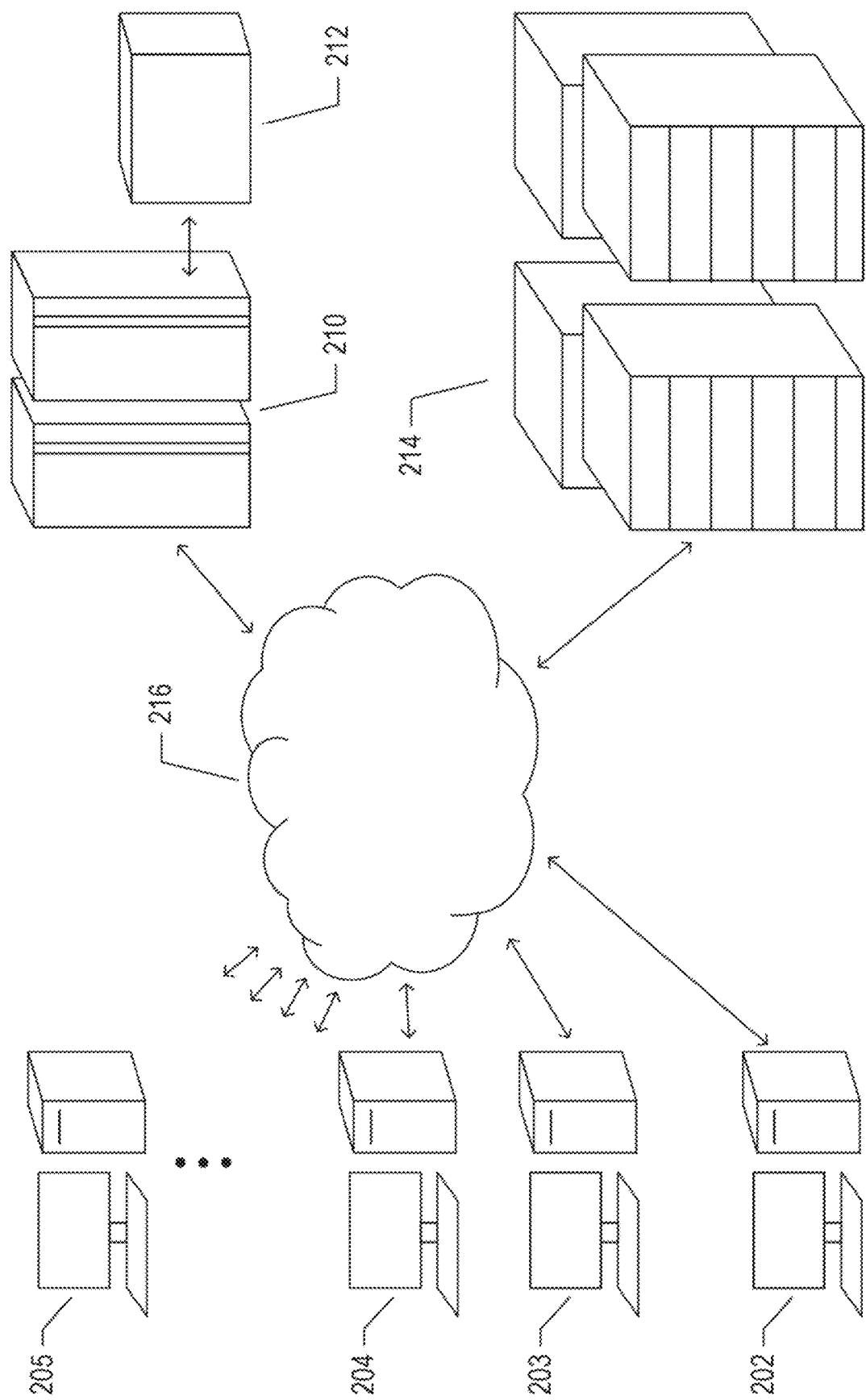
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted server computers or blade servers all interconnected through various communications and networking systems that together comprise the Internet 216. Such distributed computing systems provide diverse arrays of functionalities. For example, a PC user may access hundreds of millions of different websites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web server computers, back-end computer systems, and data-storage systems for serving web pages to remote customers, receiving orders through the web-page interface, processing the orders, tracking completed orders, and other myriad different tasks associated with an e-commerce enterprise.

Figure 3:
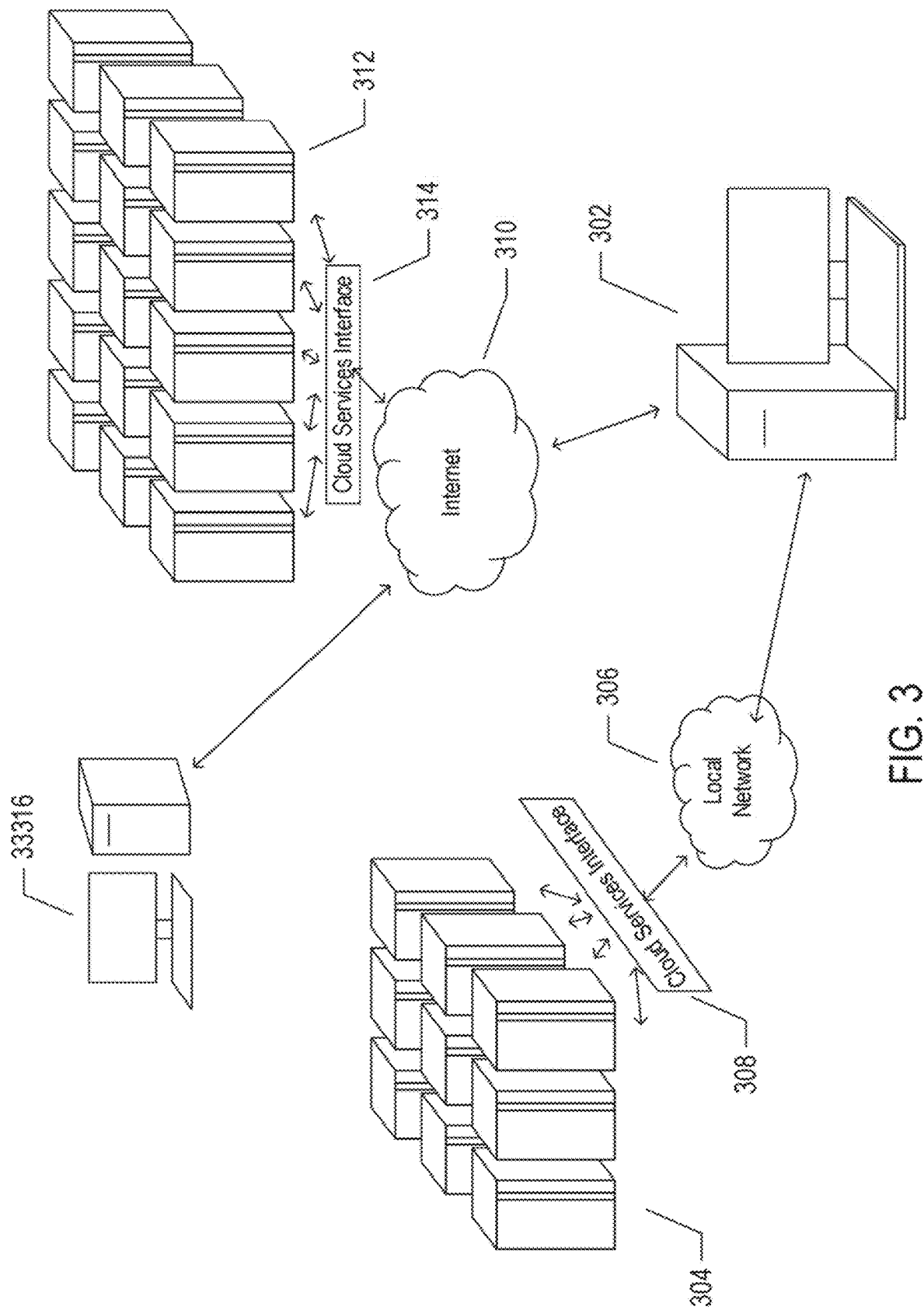
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational bandwidth and data-storage needs, rather than purchasing sufficient computer systems within a physical data center to handle peak computational bandwidth and data-storage demands. Moreover, small organizations can completely avoid the overhead of maintaining and managing physical computer systems, including hiring and periodically retraining information-technology specialists and continuously paying for operating-system and data-base-management-system upgrades. Furthermore, cloud-computing interfaces allow for straightforward configuration of virtual computing facilities, flexibility in the types of applications and operating systems that can be configured, and other functionalities that are useful even for owners and administrators of private cloud-computing facilities used by a single organization.

Figure 4:
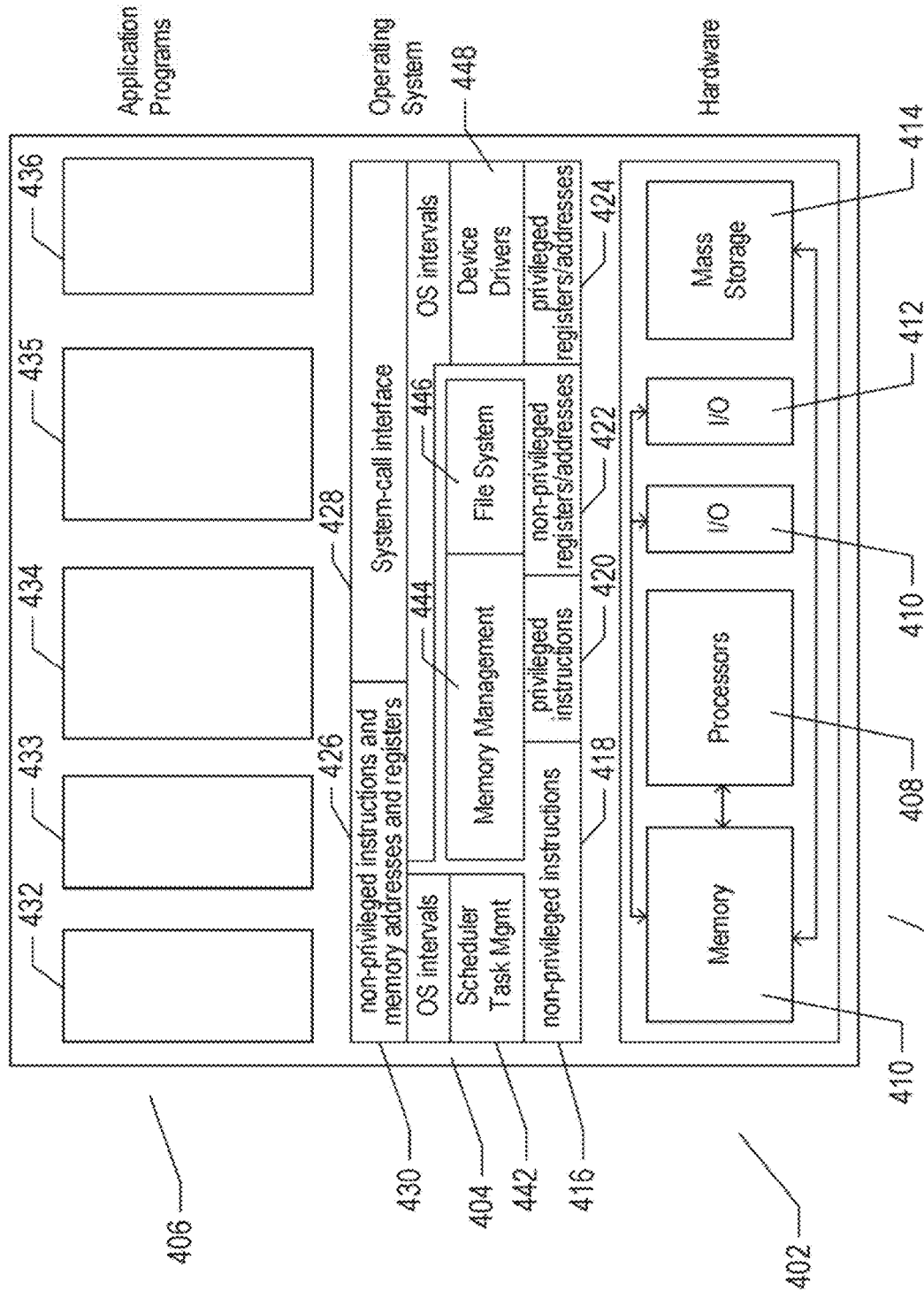
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system have resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that many different operating systems run within different types of computer hardware. In many cases, popular application programs and computational systems are developed to run on only a subset of the available operating systems and can therefore be executed within only a subset of the different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real-time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
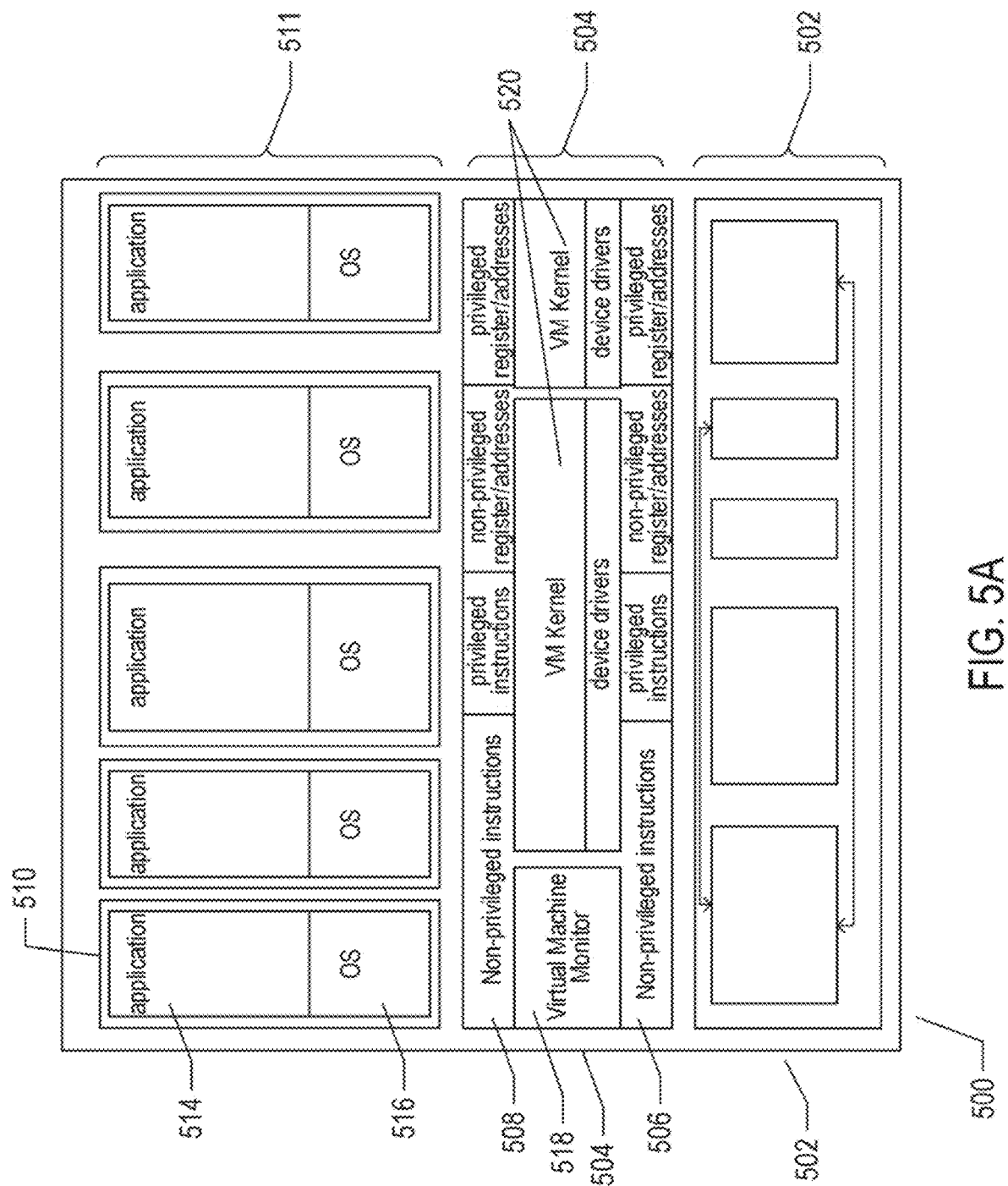
FIGS. 5A-5B show two types of virtual machines ("VMs") and VM execution environments.
Figure 5B:
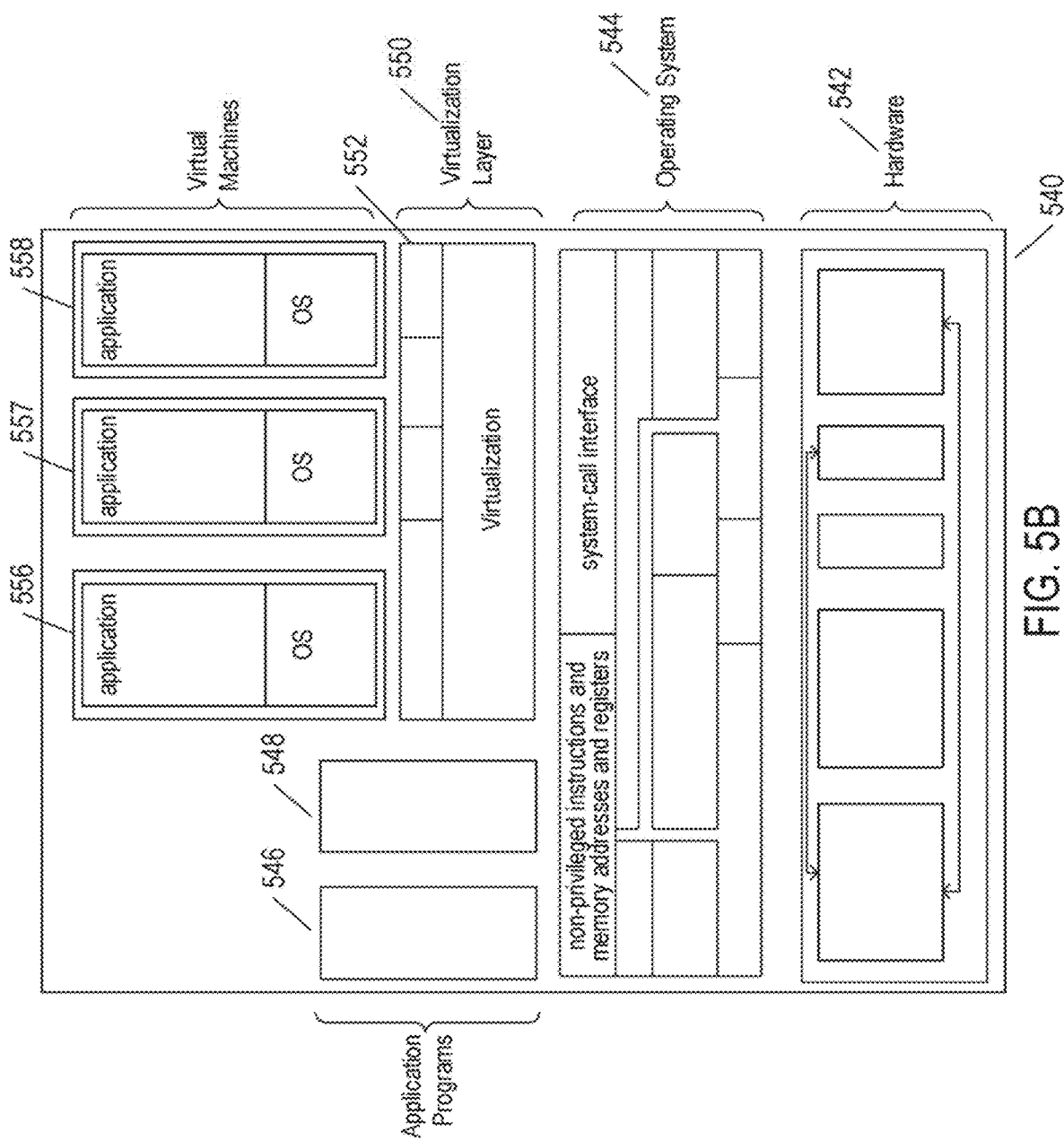

For the above reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtual layer 504 that interfaces through a virtualization-layer/hardware-layer interface 506, equivalent to interface 416 in FIG. 4, to the hardware. The virtual layer 504 provides a hardware-like interface to many VMs, such as VM 510, in a virtual-machine layer 511 executing above the virtual layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interface to the virtual layer interface 504 rather than to the actual hardware interface 506. The virtual layer 504 partitions hardware devices into abstract virtual-hardware layers to which each guest operating system within a VM interface. The guest operating systems within the VMs, in general, are unaware of the virtual layer and operate as if they were directly accessing a true hardware interface. The virtual layer 504 ensures that each of the VMs currently executing within the virtual environment receives a fair allocation of underlying hardware devices and that all VMs receive sufficient devices to progress in execution. The virtual layer 504 may differ for different guest operating systems. For example, the virtual layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtual layer 504 includes a virtual-machine-monitor module 518 ("VMM"), also called a "hypervisor," that virtualizes physical processors in the hardware layer to create virtual processors on which each of the VMs executes. For execution efficiency, the virtual layer attempts to allow VMs to directly execute non-privileged instructions and to directly access non-privileged registers and memory. However, when the guest operating system within a VM accesses virtual privileged instructions, virtual privileged registers, and virtual privileged memory through the virtual layer 504, the accesses result in the execution of virtualization-layer code to simulate or emulate the privileged devices. The virtual layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtual layer 504 essentially schedules the execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtual layer 550 is also provided, in computer 540, but, unlike the virtual layer 504 discussed with reference to FIG. 5A, virtual layer 550 is layered above the operating system 544, referred to as the "host OS," and uses the operating system interface to access operating-system-provided functionality as well as the hardware. The virtual layer 550 comprises primarily a VMM and a hardware-like interface 552, similar to hardware-like interface 508 in FIG. 5A. The hardware-layer interface 552, equivalent to interface 416 in FIG. 4, provides an execution environment for VMs 556-558, each including one or more application programs or other higher-level computational entities packaged together with a guest operating system.

In FIGS. 5A-5B, the layers are somewhat simplified for clarity of illustration. For example, portions of the virtual layer 550 may reside within the host-operating-system kernel, such as a specialized driver incorporated into the host operating system to facilitate hardware access by the virtual layer.

It should be noted that virtual hardware layers, virtual layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtual layers, and guest operating systems are abstract or intangible. Virtual hardware layers, virtual layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
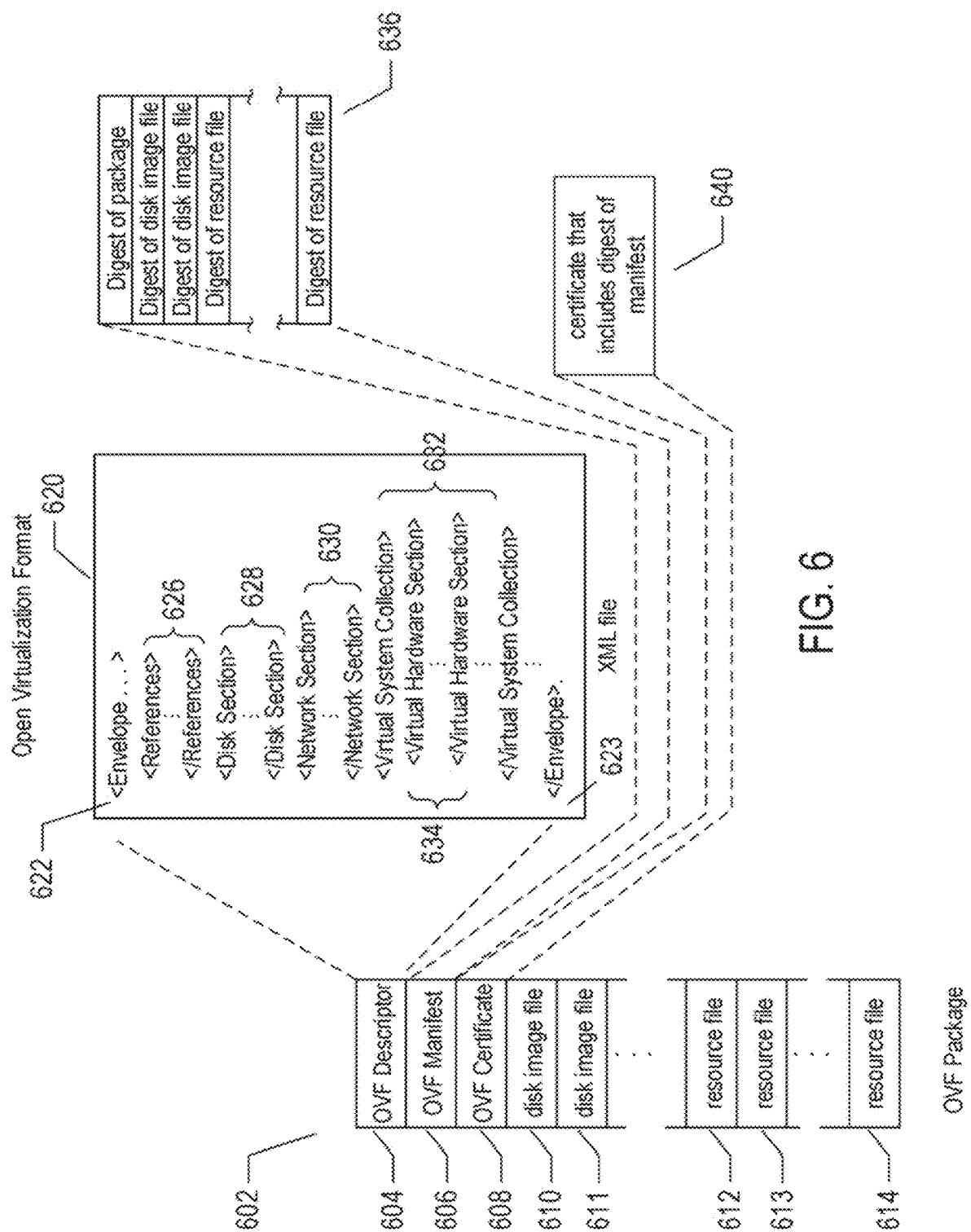
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta-information about all of the virtual disks included in the OVF package, a network section 630 that includes meta-information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and the various components of the OVF package. The OVF certificate 608 is an authentication certificate 640 that includes a digest of the manifest and that is cryptographically signed. Disk image files, such as disk image file 610, are digital encodings of the contents of virtual disks, and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or eliminated by packaging applications and operating systems together as VMs and virtual appliances that execute within virtual environments provided by virtual layers running on many different types of computer hardware. A next level of abstraction, referred to as virtual data centers or virtual infrastructure, provide a data-center interface to virtual data centers computationally constructed within physical data centers.

Figure 7:
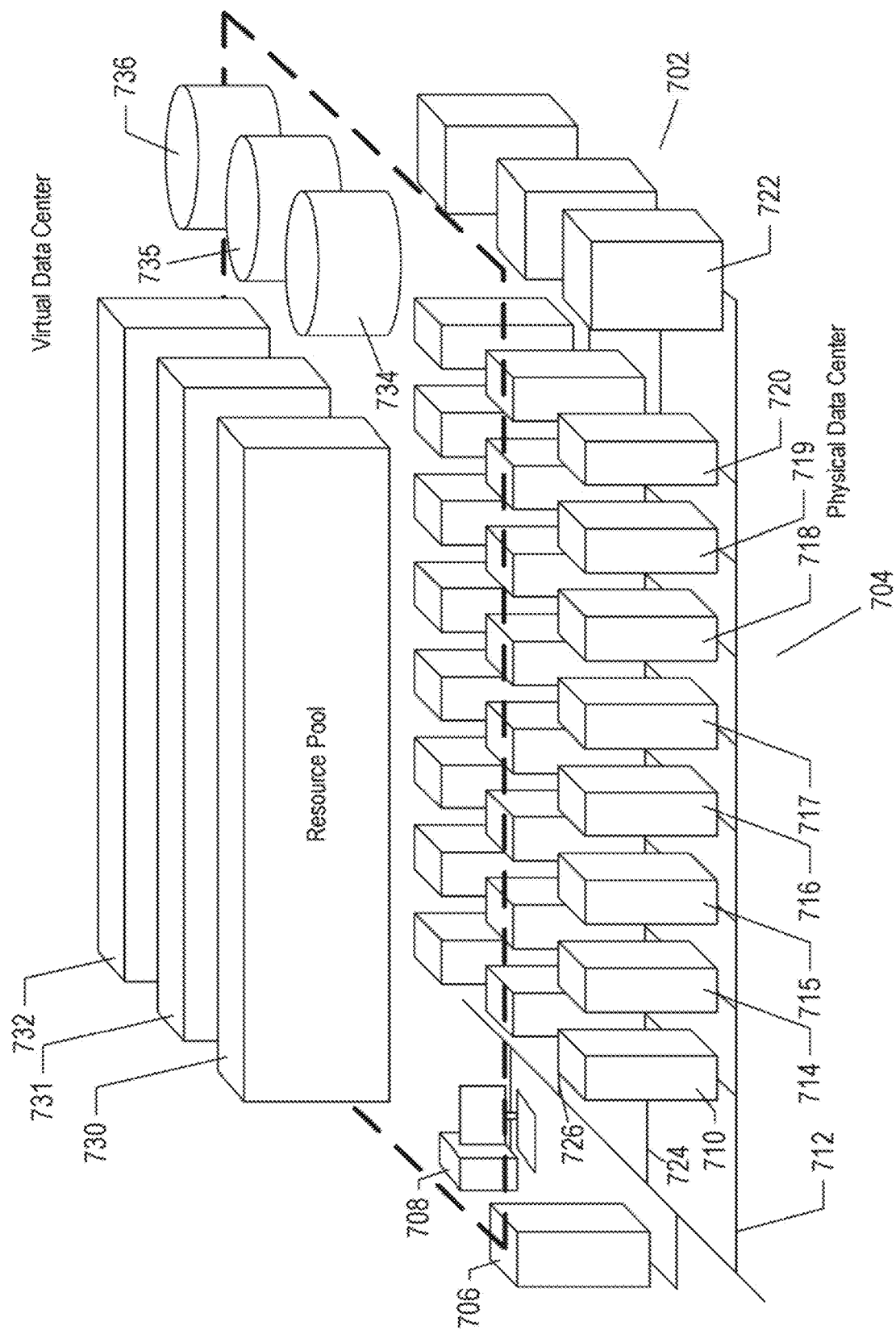
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server computer 706 and any of different computers, such as PC 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight server computers and a mass-storage array. The individual server computers, such as server computer 710, include a virtual layer and run multiple VMs. Different physical data centers may include many different types of computers, networks, data-storage systems, and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of server computers directly interconnected by a local area network.

The virtual-data-center management interface allows provisioning and launching of VMs with respect to device pools, virtual data stores, and virtual networks so that virtual-data-center administrators need not be concerned with the identities of physical-data-center components used to execute particular VMs. Furthermore, the virtual-data-center management server computer 706 includes functionality to migrate running VMs from one server computer to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute-bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual server computers and migrating VMs among server computers to achieve load balancing, fault tolerance, and high availability.

Figure 8:
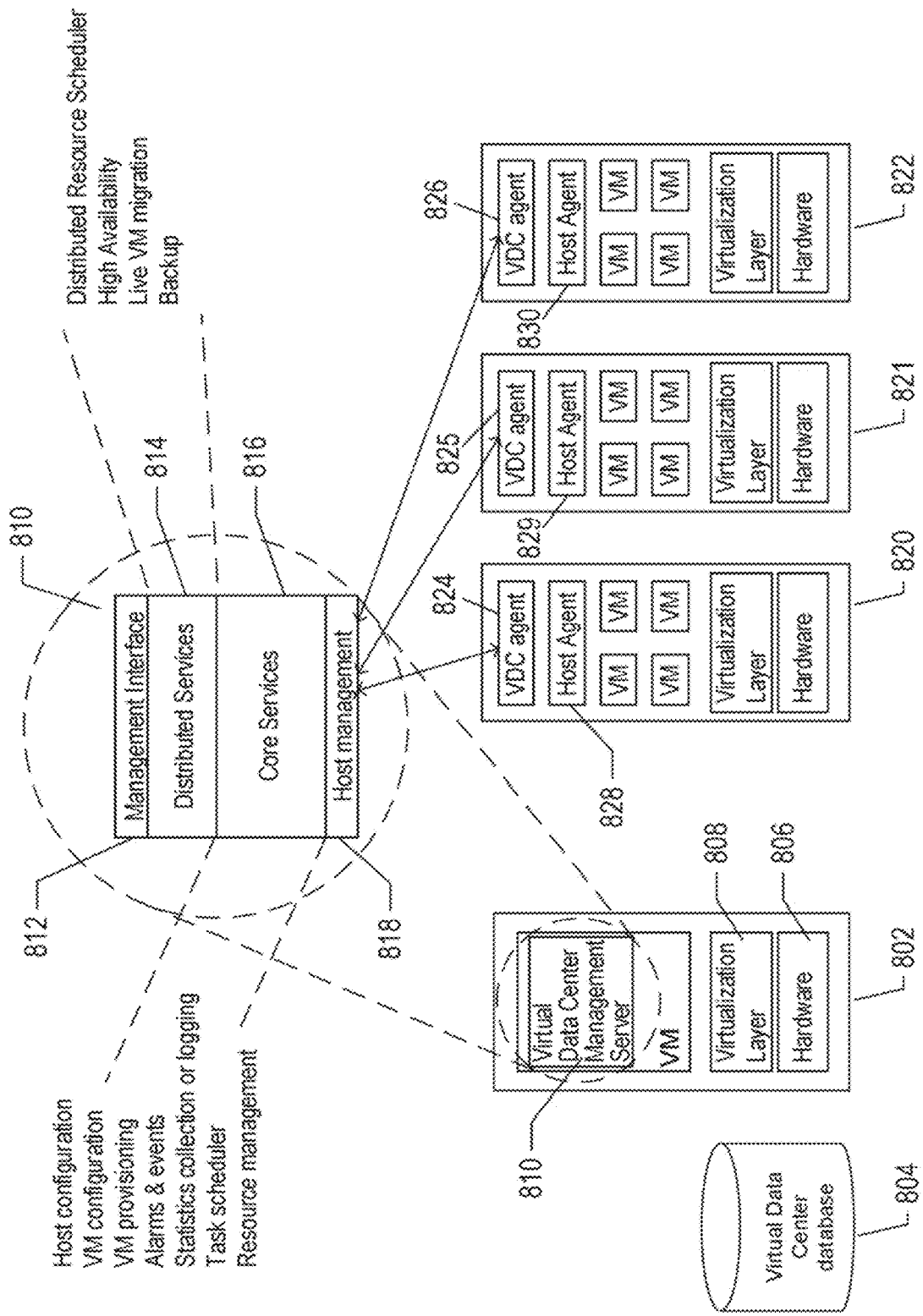
FIG. 8 shows virtual-machine components of a virtual-data-center management server and physical servers of a physical data center.

FIG. 8 shows virtual-machine components of a virtual-data-center management server computer and physical server computers of a physical data center above which a virtual-data-center interface is provided by the virtual-data-center management server computer. The virtual-data-center management server computer 802 and a virtual-data-center database 804 comprise the physical components of the management component of the virtual data center. The virtual-data-center management server computer 802 includes a hardware layer 806 and virtual layer 808, and runs a virtual-data-center management-server VM 810 above the virtual layer. Although shown as a single server computer in FIG. 8, the virtual-data-center management server computer ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the server computers of the physical data center that is abstracted to a virtual data center by the VDC management server computer.

The distributed services 814 include a distributed-device scheduler that assigns VMs to execute within particular physical server computers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server computer and restarts the VM on the different physical server computer from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alerts and events, ongoing event logging and statistics collection, a task scheduler, and a device-management module. Each of the physical server computers 820-822 includes a host-agent VM 828-830 through which the virtual layer can be accessed via a virtual-infrastructure application programming interface ("API"). This interface allows a remote administrator or user to manage an individual server computer through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server computer. The virtual-data-center agents relay and enforce device allocations made by the VDC management server VM 810, relay virtual-machine provisioning and configuration-change commands to host agents, monitor and collect performance statistics, alerts, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
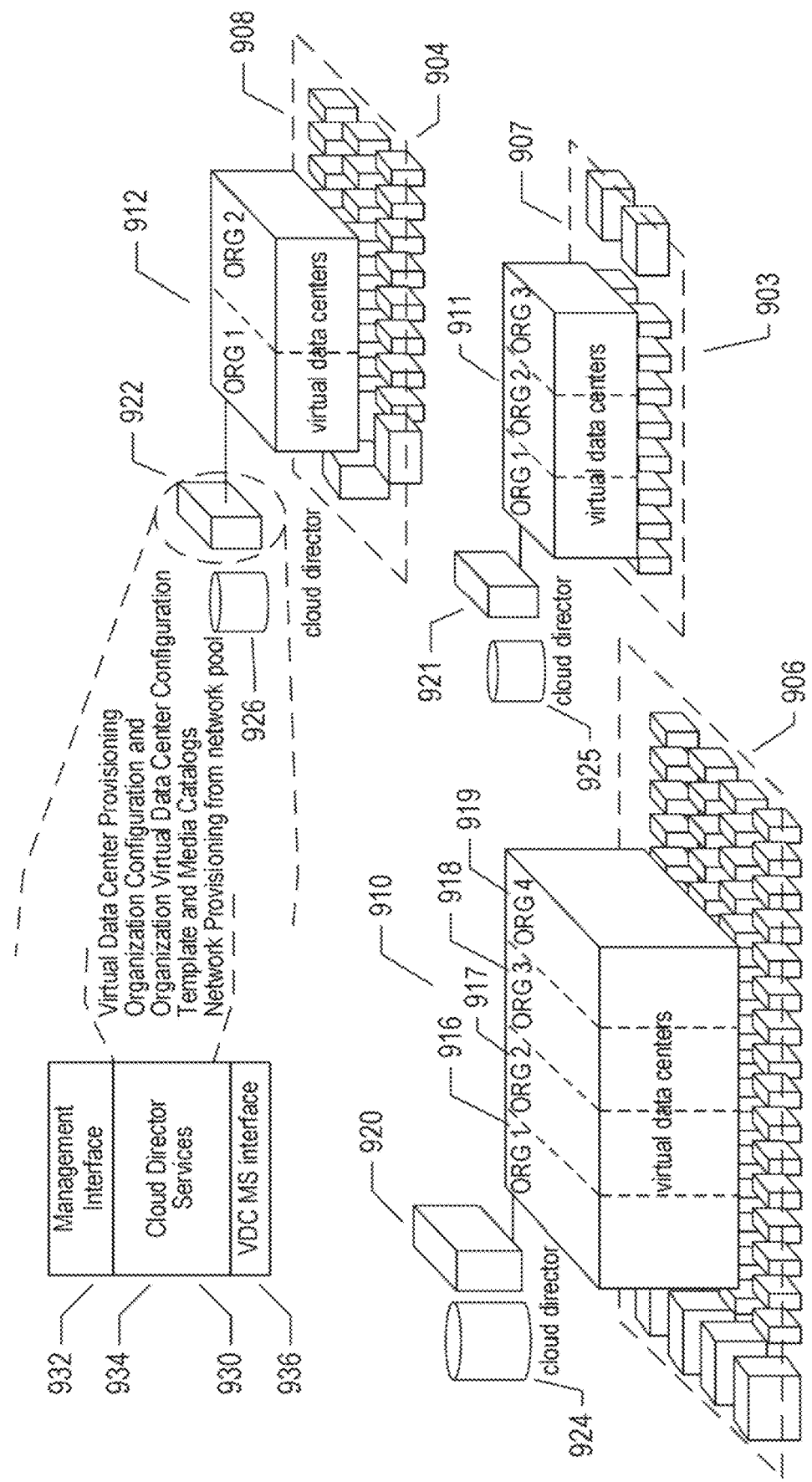
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director server computers 920-922 and associated cloud-director databases 924-926. Each cloud-director server computer or server computer runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools, and services for organization of virtual data centers and tenant-associated virtual data centers within the multi-tenant virtual data center, services associated with template and media catalogs, and provisioning of virtualization networks from a network pool. Templates are VMs that each contain an OS and/or one or more VMs containing applications. A template may include much of the detailed contents of VMs and virtual appliances that are encoded within OVF packages, so that the task of configuring a VM or virtual appliance is significantly simplified, requiring the only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
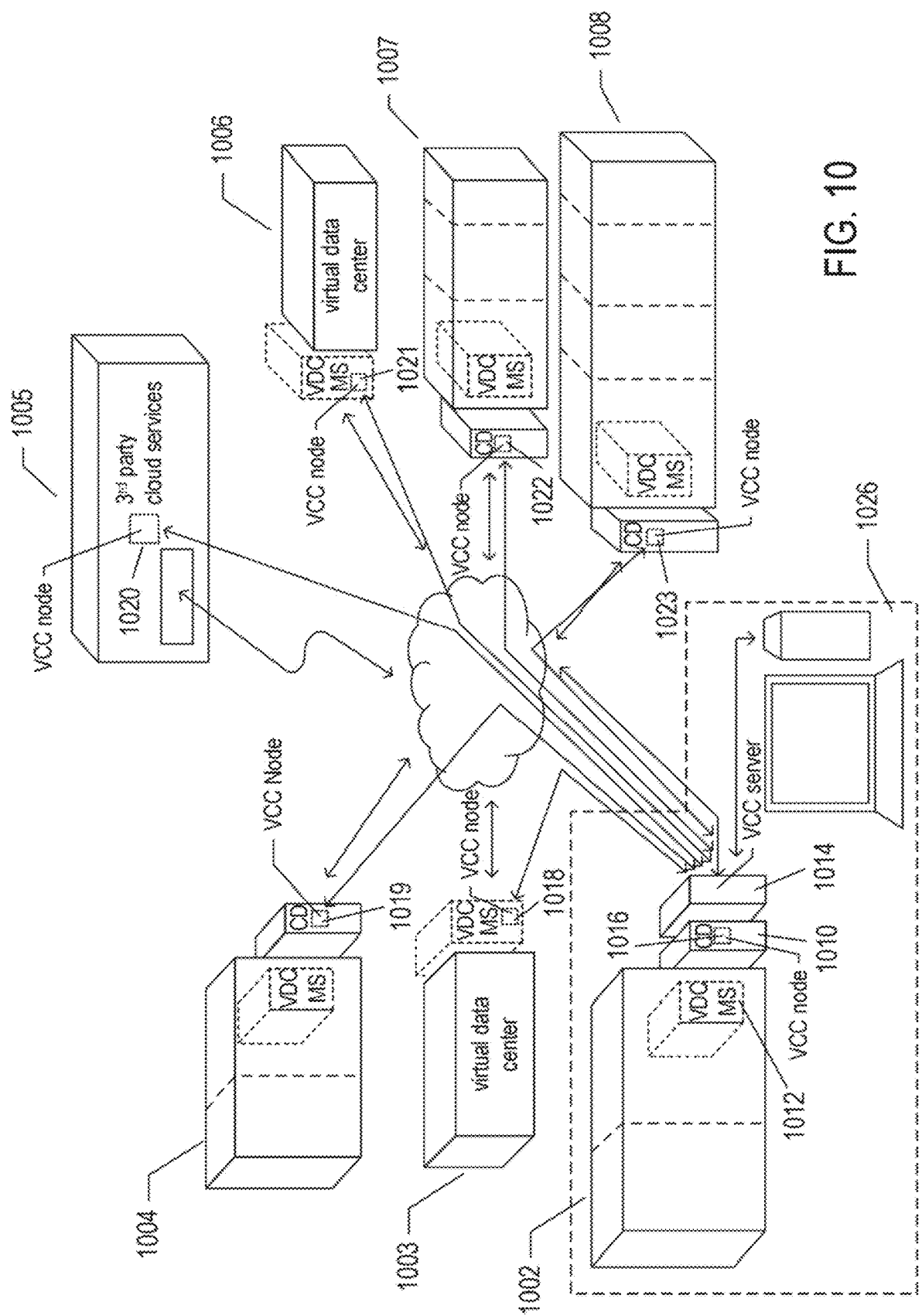
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or another computer system 1026 to allow a cloud-aggregation administrator or another user to access VCC-server-provided aggregate-cloud distributed services. In general, the cloud-computing facilities that together form a multiple-cloud-computing aggregation through distributed services provided by the VCC server and VCC nodes are geographically and operationally distinct.

As mentioned above, while the virtual-machine-based virtual layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

While a traditional virtual layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files that are not included in the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtual layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 11:
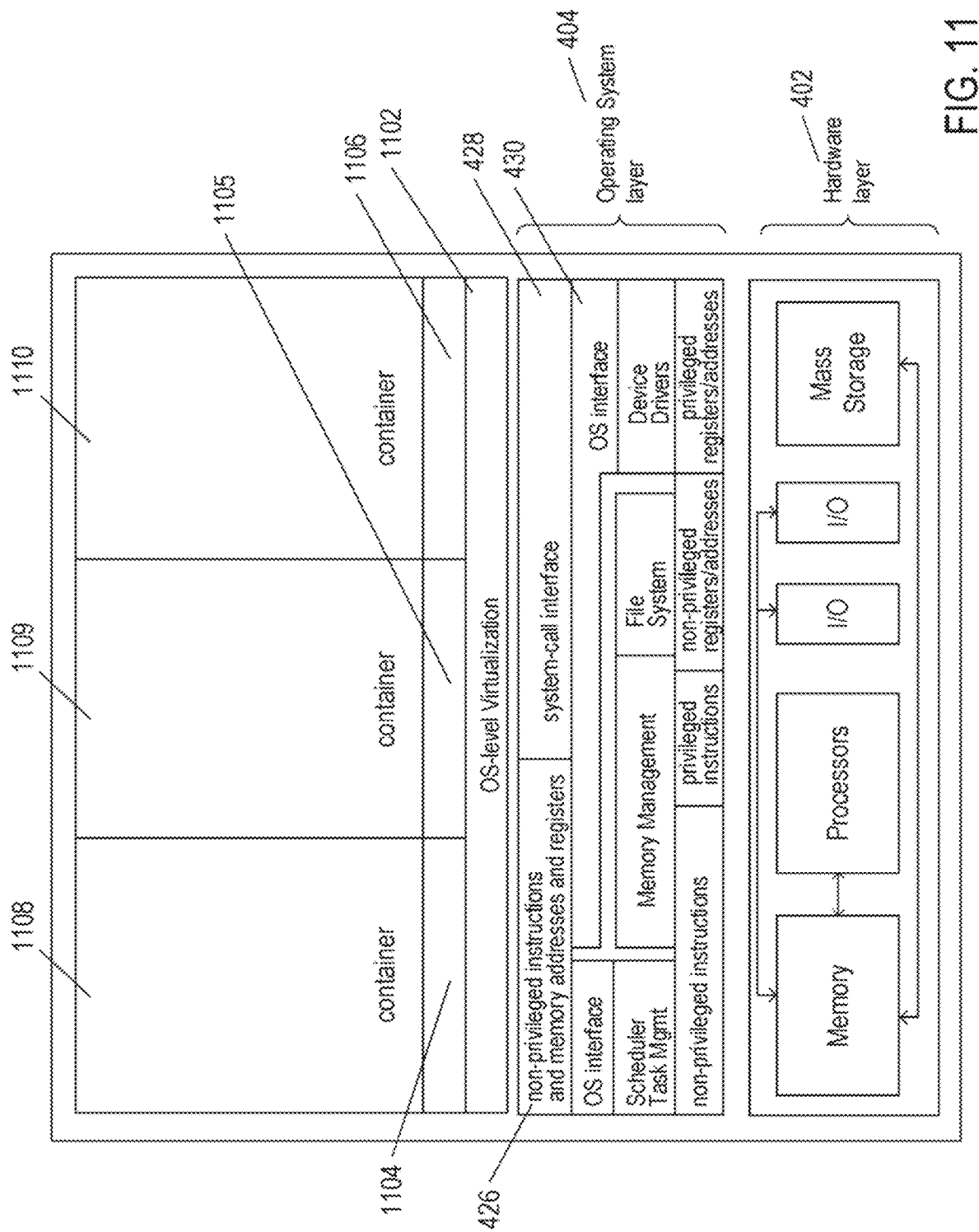
FIG. 11 shows an example server computer used to host three containers.

FIG. 11 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtual layer 1102 that provides operating-system interfaces 1104-1106 to each of the containers 1108-1110. The containers, in turn, provide an execution environment for an application that runs within the execution environment provided by container 1108. The container can be thought of as a partition of the resources generally available to higher-level computational entities through the operating system interface 430.

Figure 12:
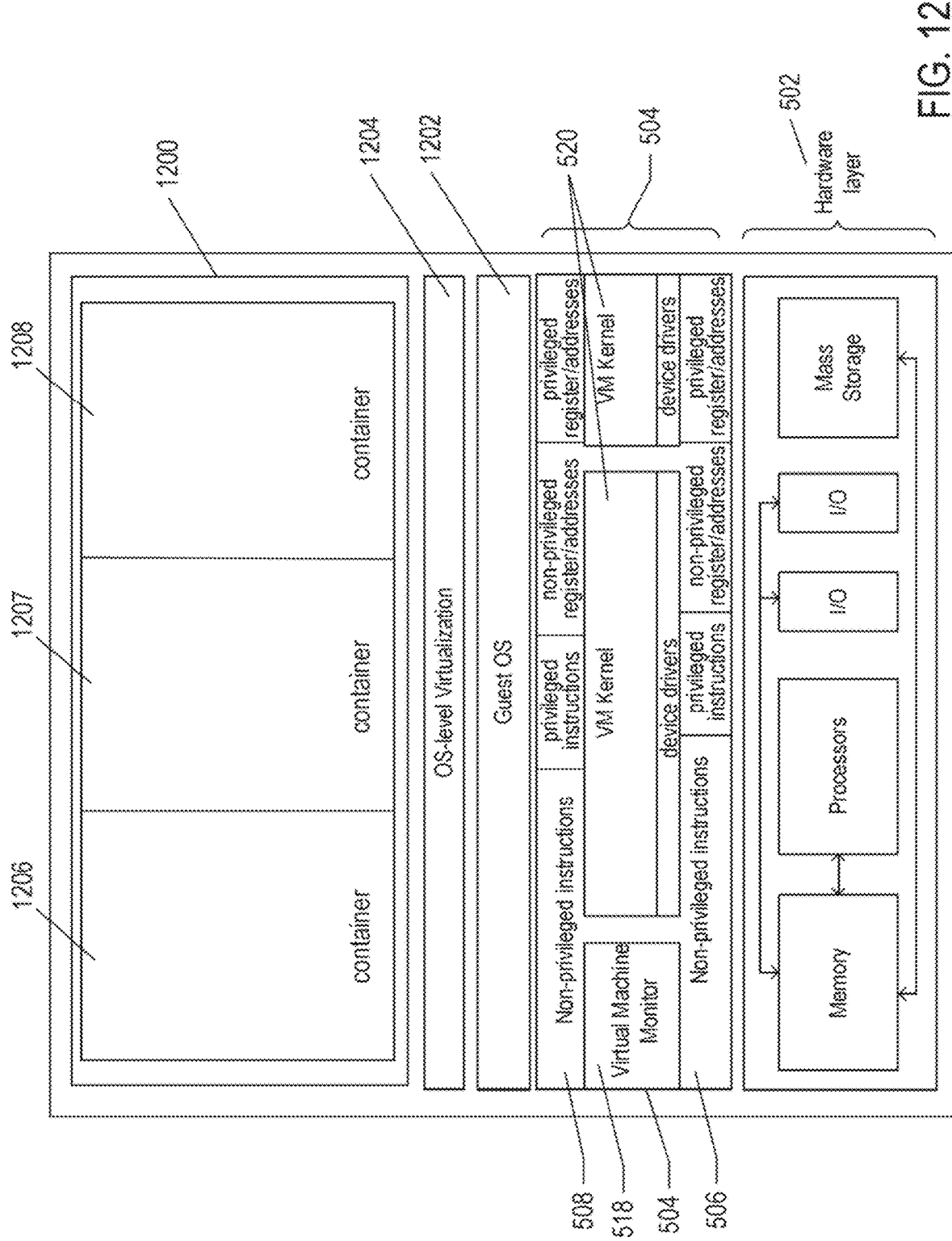
FIG. 12 shows an approach to implementing the containers on a VM.

FIG. 12 shows an approach to implementing the containers on a VM. FIG. 12 shows a host computer similar to that shown in FIG. 5A, discussed above. The host computer includes a hardware layer 502 and a virtual layer 504 that provides a virtual hardware interface 508 to a guest operating system 1102. Unlike in FIG. 5A, the guest operating system interfaces to an OSL-virtual layer 1104 that provides container execution environments 1206-1208 to multiple application programs.

Note that, although only a single guest operating system and OSL virtual layer are shown in FIG. 12, a single virtualized host system can run multiple different guest operating systems within multiple VMs, each of which supports one or more OSL-virtualization containers. A virtualized, distributed computing system that uses guest operating systems running within VMs to support OSL-virtual layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted to provide additional execution environments and associated resources for additional application instances. The resources available to the guest operating system are efficiently partitioned among the containers provided by the OSL-virtual layer 1204 in FIG. 12 because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability, distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtual layer provides for flexibility and scaling over large numbers of hosts within large distributed computing systems and a simple approach to operating-system upgrades and patches. Thus, the use of OSL virtualization above traditional virtualization in a hybrid virtualized distributed computing system, as shown in FIG. 12, provides many of the advantages of both a traditional virtual layer and the advantages of OSL virtualization.

Network Virtualization

A physical network comprises physical switches, routers, cables, and other physical devices that transmit data within a data center. A logical network is a virtual representation of how physical networking devices appear to a user and represents how information in the network flows between objects connected to the network. The term "logical" refers to an IP addressing scheme for sending packets between objects connected over a physical network. The term "physical" refers to how actual physical devices are connected to form the physical network. Network virtualization decouples network services from the underlying hardware, replicates networking components and functions in software, and replicates a physical network in software. A virtual network is a software-defined approach that presents logical network services, such as logical switching, logical routing, logical firewalls, logical load balancing, and logical private networks to connected workloads. The network and security services are created in software that uses IP packet forwarding from the underlying physical network. The workloads are connected via a logical network, implemented by an overlay network, which allows for virtual networks to be created in software. Virtualization principles are applied to a physical network infrastructure to create a flexible pool of transport capacity that can be allocated, used, and repurposed on demand.

Figure 13:
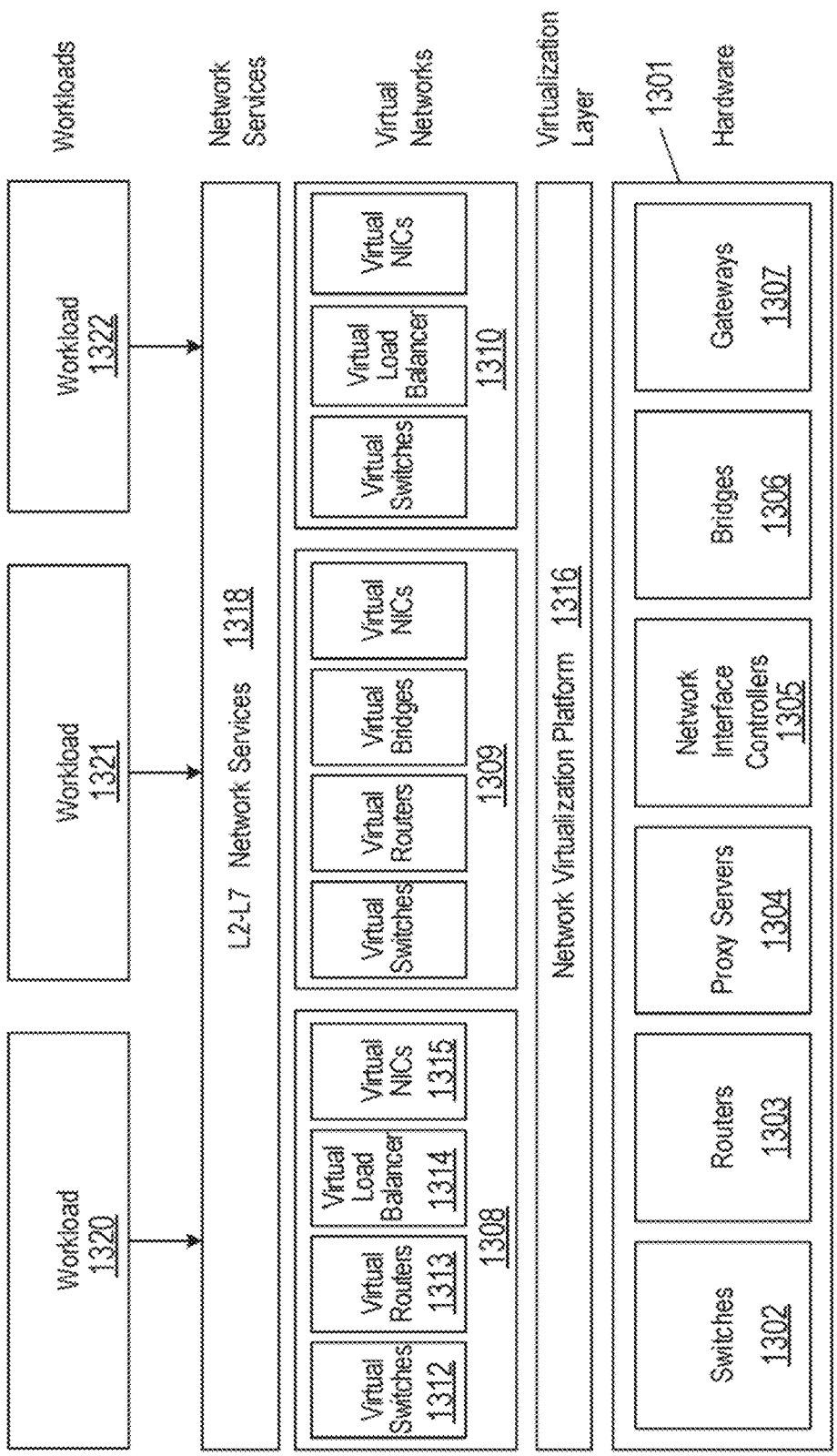
FIG. 13 shows generalized hardware and software components that form virtual networks from a general-purpose physical network.

FIG. 13 shows generalized hardware and software components that form virtual networks from a general-purpose physical network. The physical network is a hardware layer 1301 that includes switches 1302, routers 1303, proxy servers 1304, network interface controllers 1305, bridges 1306, and gateways 1307. Of course, the physical network may also include many other components not shown, such as power supplies, internal communications links and busses, specialized integrated circuits, optical devices, and many other components. In the example of FIG. 13, software components that form three separate virtual networks 1308-1310 are shown. Each virtual network includes virtual network devices that execute logical compute services. For example, virtual network 1308 includes virtual switches 1312, virtual routers 1313, a virtual load balancer 1314, and virtual network interface cards ("vNICs") 1315 that provide logical switching, logical routing, logical firewall, and logical load balancing services. The virtual networks 1308-1310 interface with components of the hardware layer 1301 through a network virtualization platform 1316 that provisions physical network services, such as L2-L7 network systems interconnection ("OSI") services, to the virtual networks 1308-1310, creating L2-L7 network services 1318 for connected workloads. For example, virtual switches, such as virtual switches 1312, may provide L2, L3, access control list ("ACL"), and firewall services. In FIG. 13, the virtual networks 1308-1310 provide L2-L7 network services 1318 to connected workloads 1320-1322. VMs, containers, and multi-tier applications generate the workloads 1320-1322 that are sent using the L2-L7 network services 1318 provided by the virtual networks 1308-1310.

Figure 14A:
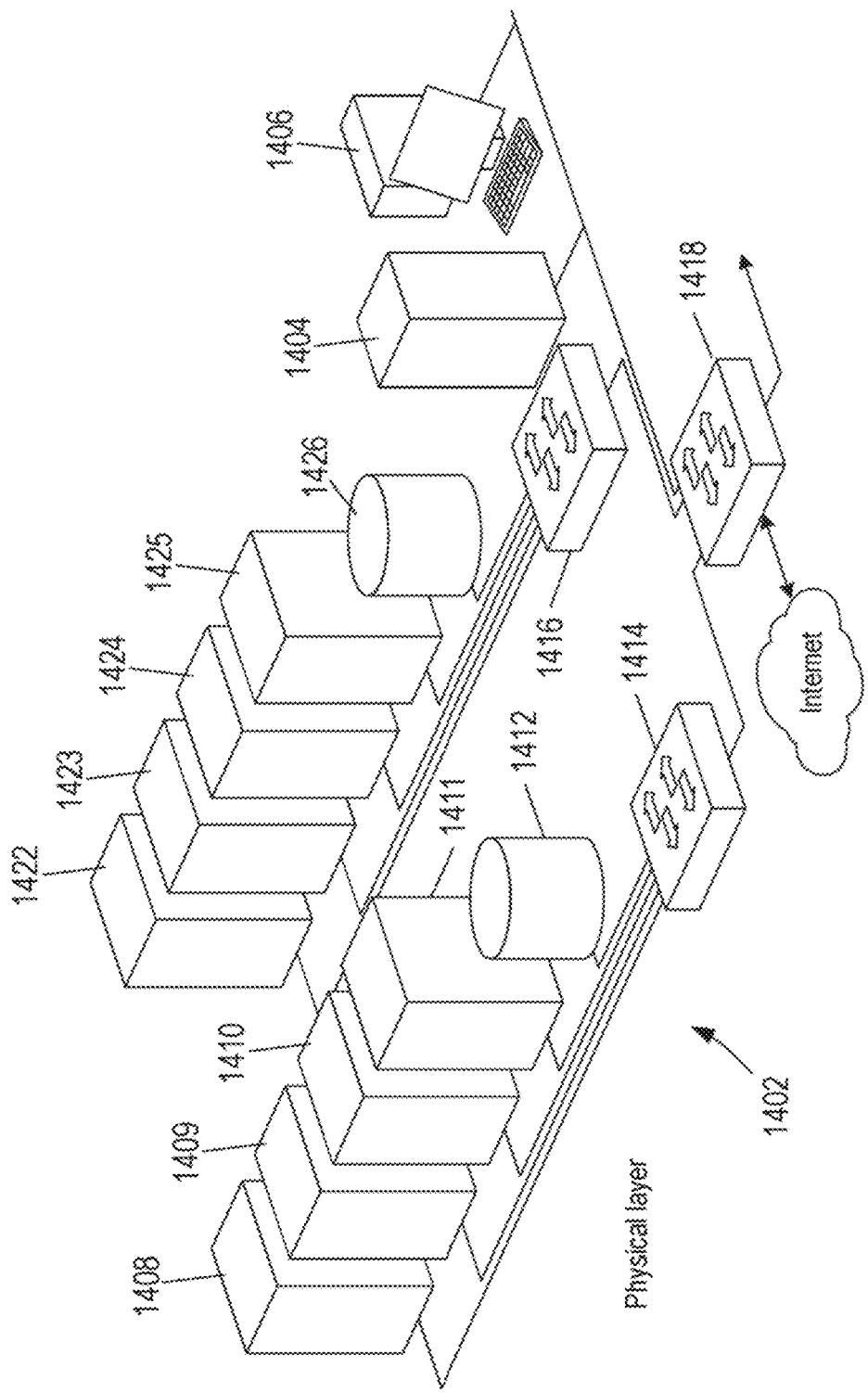
FIGS. 14A-14B show a physical layer of a data center and a virtual layer.
Figure 14B:
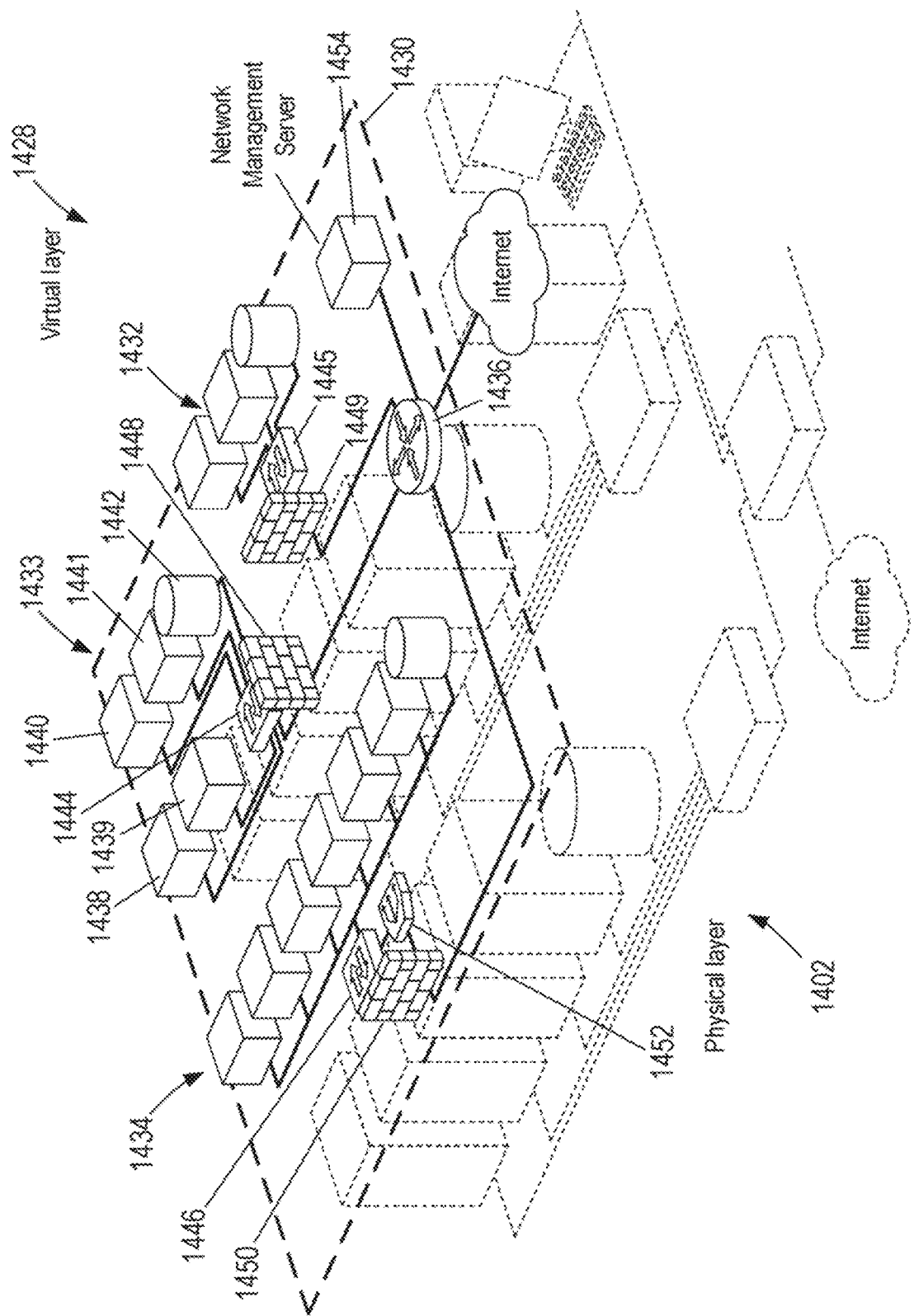

FIGS. 14A-14B show an example of objects of a physical layer of a data center and objects of a virtual layer, respectively. In FIG. 14A, a physical data center 1402 comprises a management server computer 1404 and any of various computers, such as PC 1406, on which a virtual-data-center management interface may be displayed to system administrators and other users. Objects of the physical data center 1402 additionally include hosts or server computers, such as server computers 1408-1411, mass-storage devices, such as a mass-storage device 1412, switches 1414 and 1416, and a top of rack ("TOR") switch 1418 that connects the server computers and mass-storage devices to the Internet, the virtual-data-center management server 1404, the PC 1406, and other server computers and mass-storage arrays (not shown). In the example of FIG. 14A, each of the switches 1414 and 1416 interconnects four server computers and a mass-storage device to each other and connects the server computers and the mass-storage devices to the TOR switch 1418. For example, the switch 1414 interconnects the four server computers 1408-1411 and the mass-storage device 1412 to a TOR switch 1418 that is in turn connected to the switch 1416, which interconnects four server computers 1422-1425 and a mass-storage device 1426. The example physical data center 1402 is provided as an example of a data center. Physical data centers may include a multitude of server computers, networks, data storage systems, and devices connected according to many different types of connection topologies.

In FIG. 14B, a virtual layer 1428 is separated from the physical data center 1402 by a virtual-interface plane 1430. The virtual layer 1428 includes virtual objects, such as VMs, containers, and virtual components of three example virtual networks 1432-1434, hosted by the server computers of the physical data center 1402. Each virtual network has a network edge that is executed in a VM and serves as a platform for maintaining the corresponding virtual network services, such as a corresponding firewall, switch, and load balancing. Each virtual network includes a virtual switch that interconnects VMs of an organization to virtual storage and to a virtual router 1436. For example, virtual network 1433 comprises VMs 1438-1441 that run different components of a distributed application and virtual storage 1442 interconnected by a virtual switch 1444 that is connected to the virtual router 1436. In the example of FIG. 14B, firewalls 1448-1450 provide network security by controlling incoming and outgoing network traffic to the virtual networks 1433-1435 based on predetermined security rules. In this example, the network edge of the virtual network 1434 executes a load balancer 1452 that evenly distributes workloads to the VMs connected to the virtual network. FIG. 14B also shows a network management server 1454 that is hosted by the management computer server 1404, maintains network policies, and executes the methods described below. The virtual layer 1428 is provided as an example virtual layer. Different virtual layers include many different types of virtual switches, virtual routers, virtual ports, and other virtual objects connected according to many different types of network topologies.

The functionality of a data center network is characterized in terms of network traffic and network capacity. Network traffic is the amount of data moving through a network at any point in time and is typically measured as a data rate, such as the number of bits, bytes, or data packets transmitted per unit time. The throughput of a network channel is the rate at which data is communicated from a channel input to a channel output. The capacity of a network channel is the maximum possible rate at which data can be communicated from an input of the channel to an output of the channel. Network capacity is the maximum possible rate at which data can be communicated from channel inputs to channel outputs of the network. Application throughput is a measure of the number of requests per unit time that the application process successfully.

Automated Computer-Implemented Processes and Systems for Troubleshooting a Network Used by an Application Running in a Distributed Computing System Enterprises, governments, and other organizations conduct commerce, provide services over the Internet, and process large volumes of data using distributed applications executed in distributed computing systems. A distributed application comprises multiple software components that are executed in VMs or containers that are in turn run on one or more server computers of a distributed computing system. The software components communicate and coordinate actions to appear as a single coherent application to an end user. Consider, for example, a distributed application that provides banking services to users via a bank website or a mobile application ("mobile app") executed on a mobile device. One component provides front-end services that enable users to input banking requests and receive responses to requests via the website or the mobile app. Each user only sees the features provided by the website or mobile app. Other components of the distributed application perform back-end services that are executed in the distributed computing system. These services include processing user banking requests, maintaining data storage, and retrieving user information from data storage.

Automated computer-implemented processes and systems described herein are directed to troubleshooting networks used by distributed applications running in a distributed computing system, such as a data center. The processes and systems execute a framework for network troubleshooting of an application ("FANTA"). FANTA is run in a network management server or a server computer, such as the example management server computer 1404 in FIG. 14A. FANTA provides one-click network fault localization in the application context. FANTA reduces mean time to resolution of a network problem, or mean time to a determination that the network is innocent as the source of the problem, from what previously took hours or days to just minutes or seconds.

Detecting a Problem with an Application

FANTA receives streams of time-dependent metric data generated by operating systems or metric monitoring agents of various entities that transmit data over a data center network. A stream of metric data associated with an entity comprises a sequence of time-ordered metric values that are recorded in spaced points in time called "time points." A stream of metric data is simply called a "metric" and is denoted by $$(y_i)_{i=1}^{N} = (y(t_i))_{i=1}^{N} \quad (1)$$

where

N is the number of metric values in the sequence;

$y_i = y(t_i)$ is a metric value;

$t_i$ is a time point indicating when the metric value was generated and/or recorded in a data storage device; and subscript i is a time point index i=1, . . . , N.

Figure 15:
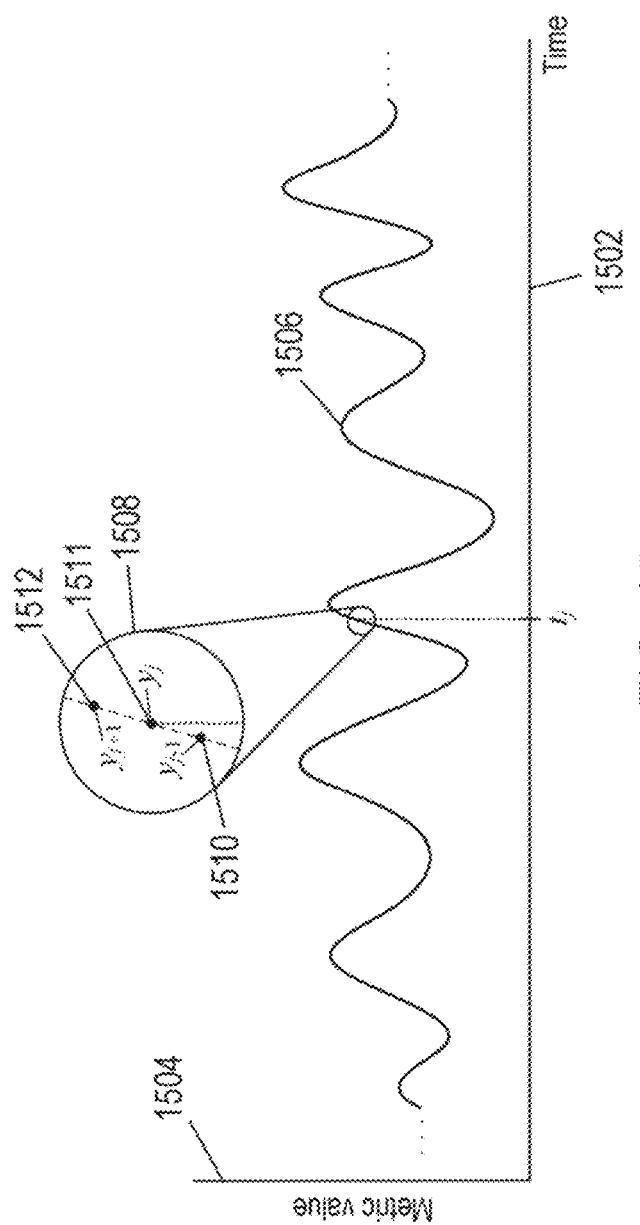
FIG. 15 shows a plot of an example metric.

FIG. 15 shows a plot of an example metric. Horizontal axis 1502 represents time. Vertical axis 1504 represents a range of metric value amplitudes. Curve 1506 represents a metric as time series data. Although metrics are illustrated herein as curves, in practice, each metric comprises a sequence of discrete metric values in which each metric value is recorded in a data-storage device. FIG. 15 includes a magnified view 1508 of three consecutive metric values represented by points. Each point represents an amplitude, or magnitude, of the metric at a corresponding time point. For example, points 1510-1512 represent consecutive metric values (i.e., amplitudes) $y_{i-1}$, $y_i$, and $y_{i+1}$ recorded in a data-storage device at corresponding time points $t_{i-1}$, $t_i$, and $t_{i+1}$. The example metric may represent usage of a physical or virtual object. For example, the metric may represent CPU usage of a core in a multicore processor of a server computer over time or CPU usage of a VM. The metric may represent the amount of virtual memory a VM uses over time. The metric may represent network throughput, packet drops, or traffic rate for a server computer, VM, a router interface or a switch port.

FANTA also receives key performance indicator ("KPI") metrics that represent performance and availability of a distributed application running in distributed computing environment. FANTA monitors an application latency KPI and application throughput KPI for an indication of anomalous behavior of the application. The application latency KPI is the time interval between sending a request to an application and receiving a response from the application. For example, application latency is the time spent between sending an application programming interface ("API") request and receiving an API response. When an application is unreachable (i.e., not responsive to a request), the application latency is considered infinite. An application latency alert is triggered when the application latency is greater that a latency threshold for a period of time. Application throughput, on the other hand, is a function of the support capacity of the application and the current load on the application. An application throughput alert is triggered when the application throughput is less than a throughput threshold for a period of time. The availability and performance of distributed applications running in a data center largely depends on the data center network successfully passing data over data center virtual networks.

FANTA identifies anomalous behavior of an application by computing an absolute difference between a long-term mean of most recent metric values of the application latency KPI, or the application throughput KPI, and short-term mean of the most metric values of the KPI. The long-term time interval is denoted by $[t_j, t_f]$, where $t_j$ is the start time of the time interval and $t_f$ is the end time of the time interval. A user selects the start time $t_j$ and the end time $t_f$ of the time interval. For example, the duration of the time interval may be thirty seconds, one minute, five minutes, ten minutes, thirty minutes, an hour, or any suitable period of time for detecting anomalous behavior associated with a metric. Let $M_L$ be a set of most recent metric values of a KPI over a long-term interval given by $M_L=\{y(t_i)|t_i \in [t_j, t_f]\}$. Let $M_S$ be the most recent metric values of the KPI over a short-term interval given by $M_S=\{y(t_i)|t_i \in [t_k, t_f]$ and $t_j<t_k<t_f\}$. A long-term mean is calculated by $$\mu_L = \frac{1}{n(M_L)} \sum_{y(t_i) \in M_L} y(t_i) \tag{2a}$$

and a short-term mean is calculated by:

$$\mu_s = \frac{1}{n(M_s)} \sum_{y(t_i) \in M_s} y(t_i) \tag{2b}$$

where
$n(M_L)$ is the number of metric values in the set $M_L$; and
$n(M_S)$ is the number of metric values in the set $M_S$.

When the absolute difference $|\mu_L-\mu_S|>Th_{KPI}$, where $Th_{KPI}$ is an alert threshold for the KPI, an alert is triggered indicating anomalous behavior is occurring with the starting entity.

Figure 16:
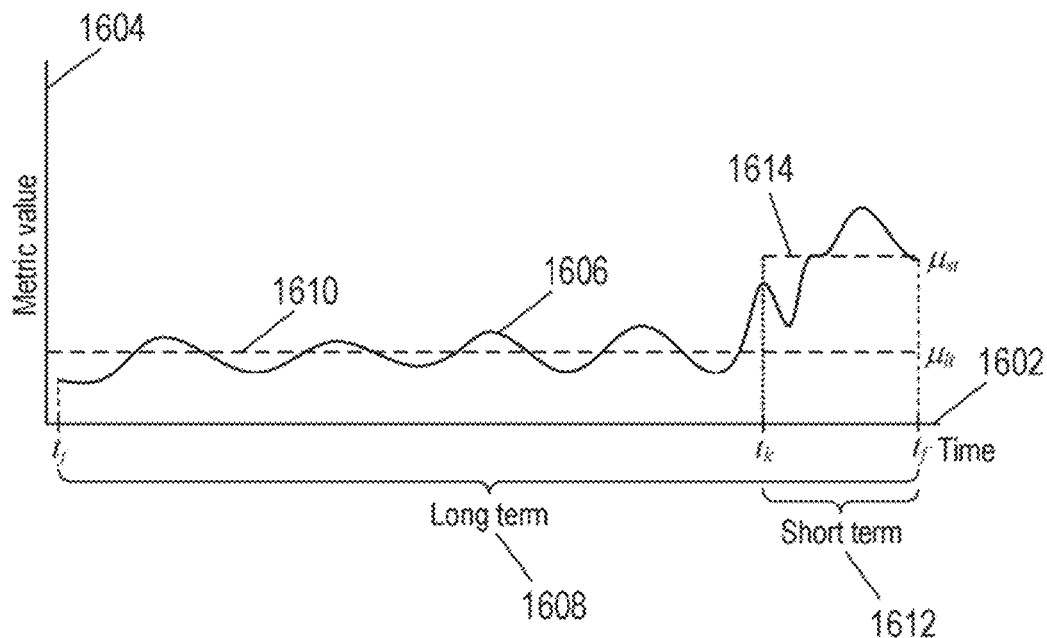
FIG. 16 shows an example key performance indicator ("KPI") and associated long-term mean and short-term mean.

FIG. 16 shows an example KPI and associated long-term mean and short-term mean. Horizontal axis 1602 represents time. Vertical axis 1604 represents a range of metric values for the KPI. Curve 1606 represents KPI metric values received and recorded by the network management server over a long-term interval $[t_j, t_f]$ 1608. Dashed line 1610 represents the long-term mean of the metric values in the long-term interval $[t_1, t_f]$ 1608. Note that short-term interval 1612 contains the most recent metric values in the long-term interval 1608. Dashed line 1614 represents the short-term mean of the KPI metric values in a short-term interval 1614. An alert is triggered in response to the condition $|\mu_L-\mu_S|>Th_{KPI}$.

In an alternative implementation, an alert may be triggered when one or more metric values deviate from the mean of a KPI in the time interval $[t_j, t_f]$. In this implementation, the metric values of the KPI are assumed to be distributed according to a normal distribution centered at a mean for the KPI metric values in the time interval $[t_1, t_f]$. The mean of a sequence of N metric values produced in the time interval $[t_j, t_f]$ is computed as follows:

$$\mu = \frac{1}{N} \sum_{i=1}^{N} y(t_i) \tag{3a}$$

where $t_i \in [t_j, t_f]$
The standard deviation of the sequence is given by $$\sigma = \sqrt{\frac{1}{N} \sum_{i=1}^{N} (y(t_i) - \mu)^2} \tag{3b}$$

The mean and standard deviation are used to form upper and lower bounds $\mu+A\sigma$ and $\mu-A\sigma$, respectively, for the KPI in the time interval. An alert is triggered when one or more metric values satisfy either of the following conditions:

$$y(t_i)>\mu+A\sigma \text{ or } y(t_i)<\mu-A\sigma \tag{3c}$$

where A is a user-selected positive number (i.e., A>0).

Figure 17:
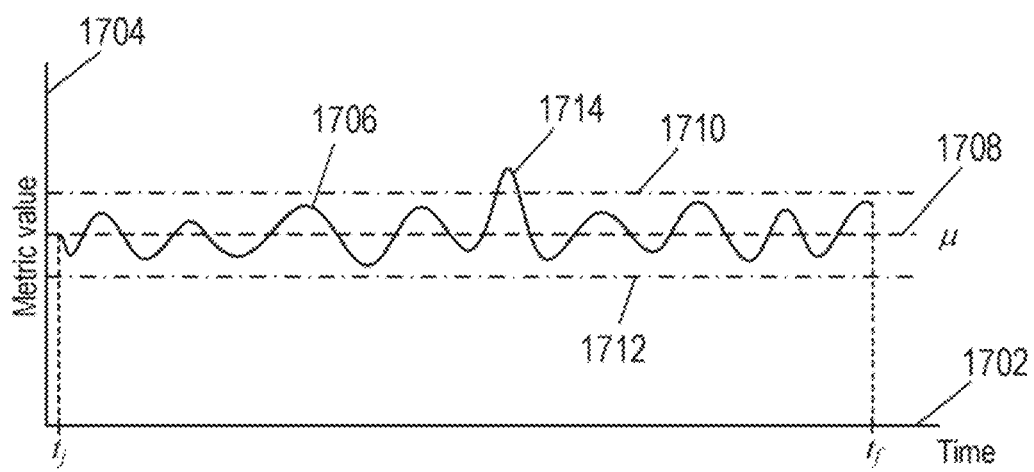
FIG. 17 shows an example KPI recorded in the time interval.

FIG. 17 shows an example KPI recorded in the time interval $[t_j, t_f]$. Horizontal axis 1702 represents time. Vertical axis 1804 represents a range of metric values for the KPI. Curve 1706 represents metric values recorded in the time interval $[t_j, t_f]$. Dashed line 1708 represents the mean of the metric values within the time interval. Dot-dashed lines 1710 and 1712 represent upper and lower bounds $\mu+A\sigma$ and $\mu-A\sigma$, respectively. In this example, metric values 1714 lie outside the upper bound 1710, which triggers an alert.

In response to detection of anomalous behavior of a starting entity as described above with reference to Equations (2a)-(2b) and (3a)-(3c) and FIGS. 16 and 17, FANTA displays an alert in a graphical user interface ("GUI") that identifies the application as exhibiting anomalous behavior and may also identify the KPI that triggered the alert. The alert may be displayed in the GUI of a system administrator console, on a console of an owner or developer of the application exhibiting the anomalous behavior, or the alert is sent in a message, such as an email message, to a system administrator and/or owner of the application.

FIG. 18 shows an example GUI 1800 that displays a list of applications. Each row identifies the name of an application, corresponding local switches, IP address of the VM, name of the data store used by the VM, and identities of a server computer that host the VM. For example, in the top row an application named "App01," uses local switch "App02-App," has IP address "aaa.bb.cc.21," stores data in data store "IT-Unity-Storage," and is executed on a host server computer identified as "w1-vmi-tmm-esx001.host1". The GUI includes a scroll bar 1802 that enables a user to scroll up and down viewing the applications executed in the VMs. In this example, a KPI of App01 has triggered an alert as described above with reference to Equations (2a)-(2b) or Equations (3a)-(3c). The alert 1804 indicates application latency for App01 is unacceptable. Note that each row includes a button labeled "TROUBLESHOOT," which enables a user to perform troubleshooting in one click. In this example, because App02 has been identified as exhibiting anomalous behavior, a user may begin troubleshooting the network associated with App02 by clicking on the "TROUBLESHOOT" button 1806.

FANTA performs automated troubleshooting based on network infrastructure problems that typically cause anomalies in application latency and/or application throughput described above. Infrastructure problems that cause anomalies in application latency and/or application throughput include:

1. An application code problem that is due to an inherent design limitation or a defect in the application code that slows generation of a response to a request, thereby increasing application latency and decreasing application throughput.

2. An application may not get enough compute cycles, thereby increasing application latency and decreasing application throughput.

3. A network problem may cause delays or data packet drops that result in the retransmission of data packets to and from the application, which increases application latency. The network problem adversely affects application throughput based on end-to-end latency and packet drops.

4. A data storage network latency and/or disk latency increases application latency and decreases application throughput.

A network can be conceptualized as a provider of capacity that is consumed by traffic generated by the applications. A decrease in network capacity causes data packet drops and leads to application degradation. Examples of causes of decreased network capacity include:

1. A failure in a network link or channel between objects on a network. Such a failure is a 100% decrease in the capacity of the link and can cause an overload of redundant links between peers on the network.

2. A certain class and/or percentage of data packets are dropped or have errors due to hardware/software problems. The network link between objects does not provide full capacity. On the other hand, an increase in network traffic causes congestion and other problems in the network. Examples of causes of increased network capacity include:

1. An application that injects an increasing amount of data packets into the network because of a defect in an upgrade to the application.

2. An application that receives more traffic due to a sudden increase in client requests (e.g., a website shopping application during a holiday).

3. Errors in the configuration of the network may create loops in the network, thereby exponentially increasing traffic on the network.

FANTA identifies the problem that caused a decrease in network capacity and/or an increase in traffic on the network. FANTA categorizes a root cause as belonging to one of the following categories:

Manual Configuration Error: An inadvertent misconfiguration of the network is a common cause of network errors in a datacenter.

Hardware Error: Optical and electrical cables that connect server computers, switches, and routers are prone to intermittent or permanent failures, resulting in loss of connectivity and/or data packet drops.

Software Error: Network Control & Data Plane Software is prone to defects and often the cause of application latency or application throughput problems. FANTA correlates events corresponding to root cause categories. A link down event is categorized as a hardware error. Examples of manual configuration errors include an operating system ("OS") upgrade of a VM or a host, and a configuration change of data packet routing or a change to a firewall. An error event in the application is a software error.

When a user clicks on a troubleshoot button associated with a starting entity, a dependency graph for the entity is constructed from entities that send data to and receive data from the application over one or more networks of the data center. The dependency graph is a model of entities that communicate with an application over a network of the data center. For example, when a user clicks on the "TROUBLESHOOT" button 1806 in the example GUI shown in FIG. 18, the network management server constructs a dependency graph that models a network of entities that communicate with the application over a network of the data center. The network management server maintains a record of metrics for each of the physical and virtual entities of networks of the data center and IP addresses of the entities that send data to and receive data from the application on virtual and physical networks of the data center and constructs the dependency graph from this data. For example, the network management server records network metrics, such as traffic rate, throughput, packet drop rate, latency, traffic rate, CPU usage, and memory usage for entities connected to the virtual and physical networks of the data center that are used by the application and constructs a dependency graph for the application.

Figure 19A:
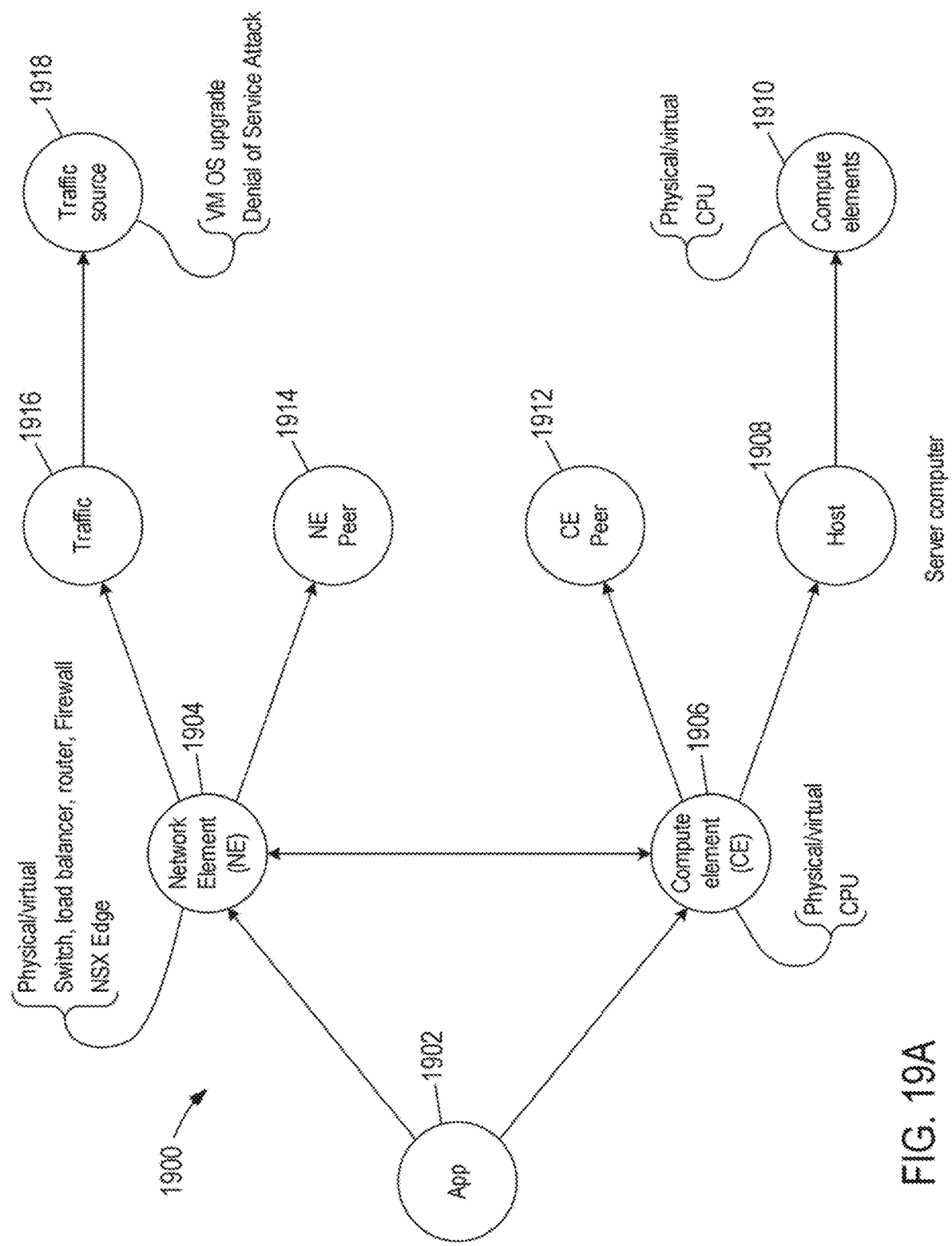
FIG. 19A shows an example of a dependency graph constructed for an application.

FIG. 19A shows an example of a dependency graph 1900 constructed for an application. The dependency graph represents application performance metrics, network performance metrics, and various kinds of errors in the network used by the application. In FIG. 19A, the application is represented by a root node 1902. Node 1904 represents a virtual or physical network element. For example, node 1904 may represent a physical switch, physical load balancer, or a physical router. Alternatively, node 1904 may represent an NSX Edge with comprises a virtual switch, virtual load balancer, and a firewall. Node 1906 represents a compute element, such as a physical CPU of the host represented by node 1908 or a virtual CPU of a VM. Node 1908 represents the host used to run the application. Node 1910 represents physical or virtual CPU usage of another entity that sends and receives data from the host 1908 over the network. Node 1912 represents a compute element in the same peer group as the compute element represented by node 1906. For example, the compute elements 1906 and 1912 can be physical or virtual CPUs that provide the same computing service. Node 1914 represents a network element in the same peer group as the network element represented by node 1904. For example, the network elements 1904 and 1914 can be peer virtual or physical switches, load balances, routers, or firewalls that provide the same service. Node 1918 represents network traffic source, such as VM OS upgrade or a denial of service ("DoS") attack on the network the application uses. Nodes 1910, 1912, 1914, and 1918 are leaf nodes of the dependency graph 1900.

Figure 19B:
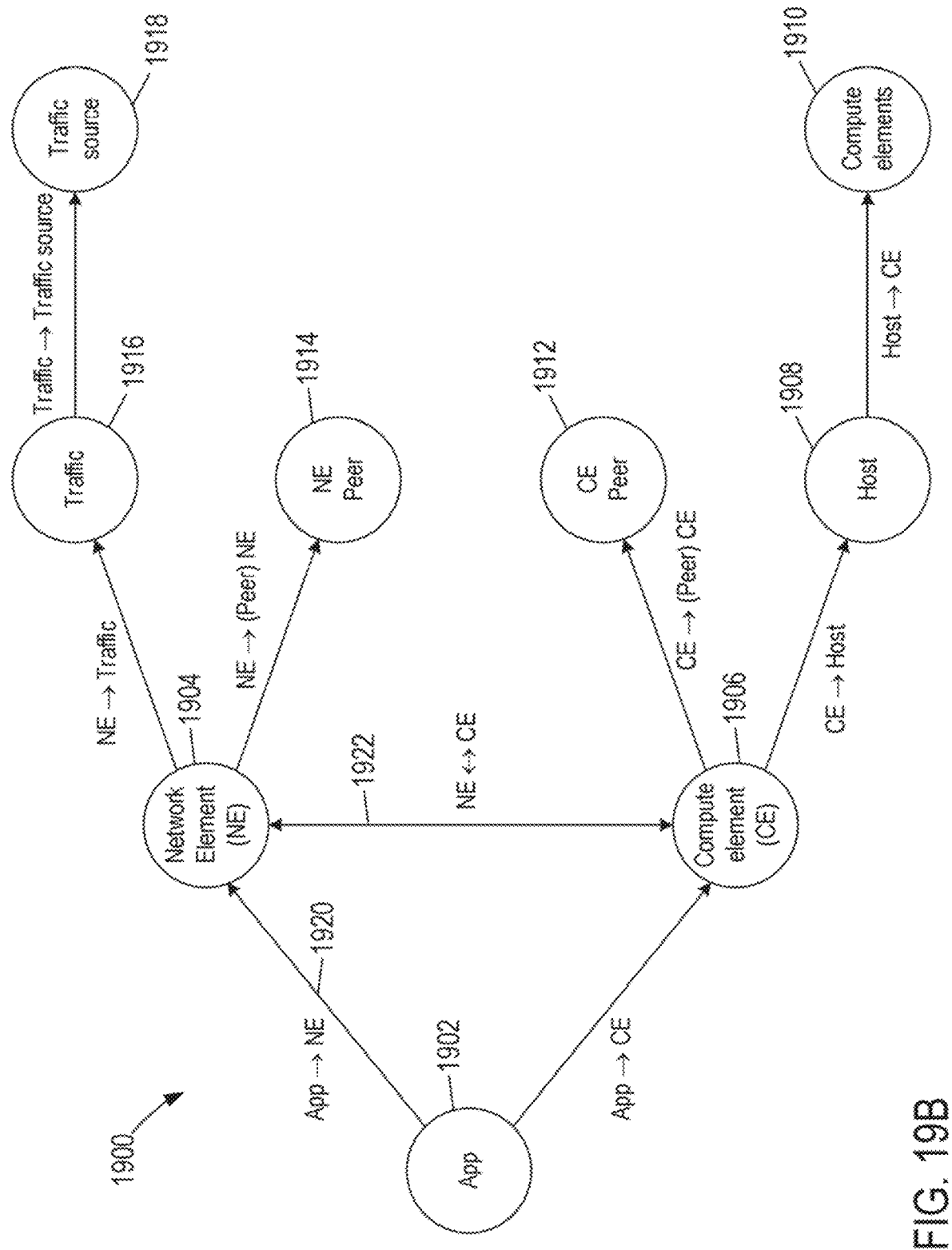
FIG. 19B identifies edges of the dependency graph in FIG. 19A.

FIG. 19B identifies the edges of the dependency graph 1900. Each edge of the dependency graph 1900 is represented by a directed arrow that connects two nodes and represents a dependency of one node on the other node. For example, edge 1920 connects node 1902 to node 1904 and represents a dependency of node 1902 on node 1904. The terms "dependent node" and "independent node" are relative terms used to describe the dependencies of two nodes connected by an edge. In other words, edge 1920 indicates the application represented by node 1902 is dependent on the network element represented by node 1904. Node 1902 is a dependent node with respect to independent node 1904. Edge 1922 is a double-headed directional arrow and represents a mutual dependency between the network element of node 1904 and the compute element of node 1906.

FANTA searches for a root cause of a latency problem or throughput problem with an application by traversing a dependency graph of the application and examining dependencies represented by edges of the dependency graph. FANTA traverses the edges of a dependency graph to systematically work backward toward from the application to specifically identify the one or more nodes that are associated with the root cause of the problem.

FIG. 20 shows a table of one or more problems associated with each of the edges of the dependency graph 1900. Column 2002 list the dependencies that correspond to the edges of the dependency graph 1900. For example, entry 2004 corresponds to edge 1920 in dependency graph 1900 and represents the application 1902 dependence on the network element 1904. Column 2006 list examples of problems at dependent nodes created by problems at independent nodes. For example, entry 2010 describes "NSX Edge packet drops causing decrease in application throughput" 2010. In this example, packet drops at the NSX Edge represented by node 1904 causes a decrease in throughput of the application 1902. Edge 1922 in the dependency graph 1900 corresponds to dependency entry 2012 in the table of FIG. 20. Entry 2014 indicates that a "traffic drop at NSX Edge explained by CPU bottleneck." In this example, a bottleneck at the CPU represented by compute element 1906 creates traffic drops in the NSX Edge represented by network element 1904. Because the nodes 1902, 1904, and 1906 are connected by edges 1920 and 1922, the decrease in throughout at the application 1902 is traced back by FANTA to the CPU of node 1906. For example, FANTA could identify the root cause of a throughput problem at the application 1902 as the bottleneck at CPU of node 1906 as creating the packet drops at NSX Edge of node 1904, which, in turn, decreased the throughput of the application of node 1902.

FANTA traverses the dependency graph from the root node to each of the leaf nodes. FANTA evaluates each node of the dependence graph for a potential root cause of a problem by systematically checking for correlations between pairs of metrics and alerts of nodes connected by each edge of the dependency graph. Each node has one or more metrics. FANTA identifies pairs of metrics of nodes connected by an edge of the dependency graph with anomalous points and change points that are correlated. For each metric of a dependent node connected by an edge to an independent node, FANTA evaluates the metric for correlation with each metric of the independent node. A pair of metrics is correlated if they have in common a number of anomalous points and/or change points above a threshold.

FIG. 21 shows a table of node types, metrics, and alerts associated with the nodes the dependency graph 1900. Column 2102 list the node type of the dependency graph 1900. For example, entries 2104, 2105, 2106, 2107, and 2108 correspond to nodes 1902, 1904, 1906, 1908, and 1916 of the dependency graph 1900. Column 2110 list examples of the types of entities represented by nodes 1902, 1904, 1906, 1908, and 1916 of the dependency graph 1900. Column 2112 list examples of the metrics associated with each of the node types. Column 2114 list alerts associated with each of the node types.

As shown in FIG. 19A, the dependency graph 1900 has a root node 1902 that represents the application. The nodes of the dependency graph are generic entity types, such as application, VM, switch, etc. For a specific application running in a datacenter, FANTA calls a resolver to determine the actual dependency entities at each node of the dependency graph 1900. FANTA includes a resolver layer that derives the actual dependencies corresponding to each edge in the dependency graph 1900 by querying an underlying data model of the entities of the nodes. The resolver layer is implemented using a data model that is represented as a resolved dependency graph.

Figure 22:
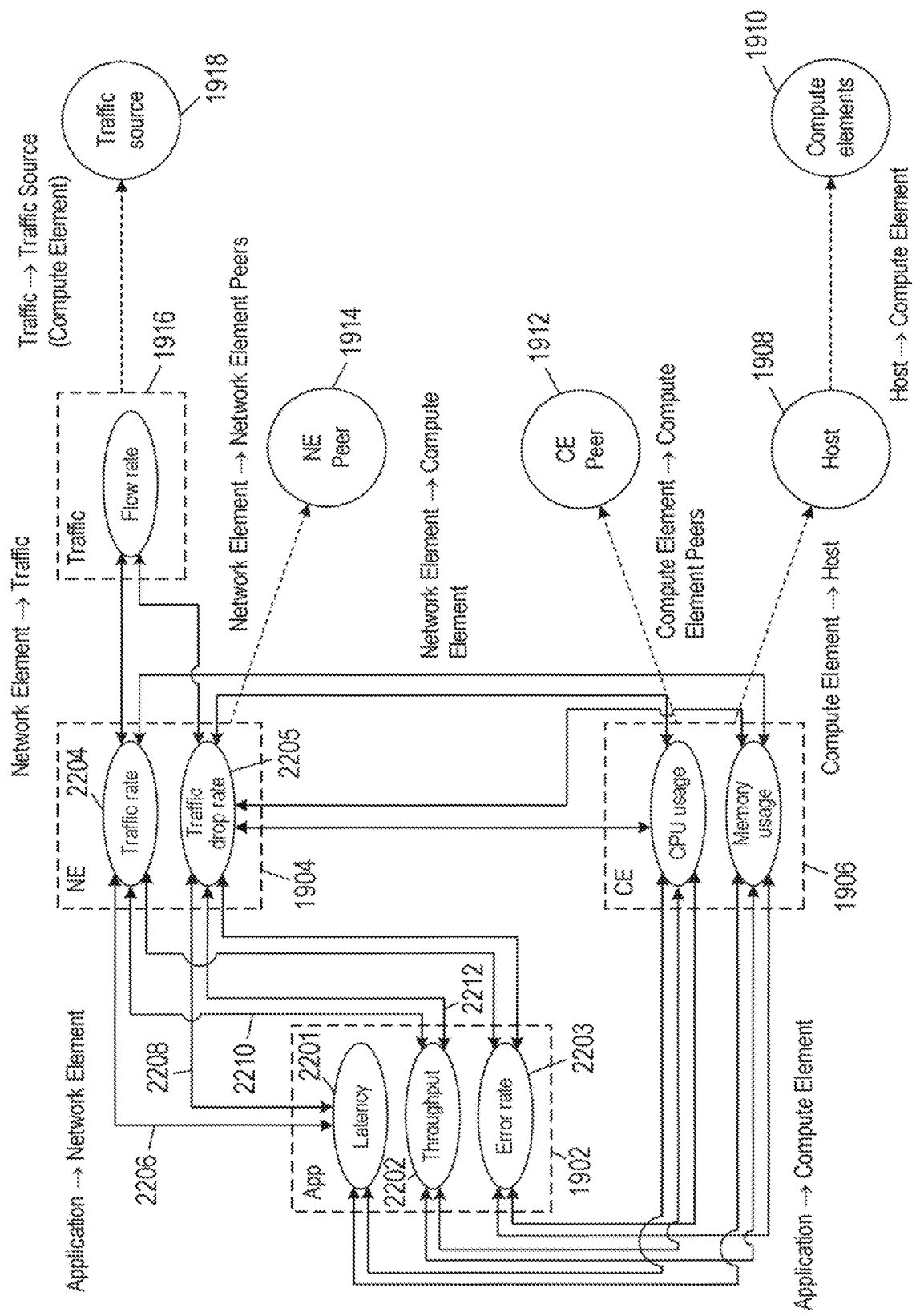
FIG. 22 shows an example expanded representation of edges and nodes of the dependency graph in FIG. 19A.

FIG. 22 shows an example expanded representation of the edges and nodes 1902, 1904, 1906, 1908, and 1916 of the dependency graph 1900 in terms of the metrics in the table of FIG. 21. For example, the application 1902 has a latency metric 2201, a throughput metric 2202, and an error rate metric 2203. Network element 1904 has a traffic rate metric 2204 and a traffic drop metric 2205. Double-headed direction arrows represent pairs of metrics. For example, directional arrow 2206 represents a pair of metrics 2201 and 2204. FANTA evaluates the latency metric 2201 for correlation with the traffic rate metric 2204. Directional arrow 2208 represents a pair of metrics 2201 and 2205. FANTA evaluates the latency metric 2201 for correlation with the traffic drop rate metric 2205. Directional arrow 2210 represents a pair of metrics 2202 and 2204. FANTA evaluates the throughput metric 2202 for correlation with the traffic rate metric 2204. Directional arrow 2212 represents a pair of metrics 2202 and 2205. FANTA evaluates the throughput metric 2202 for correlation with the traffic drop rate metric 2205.

The dependency graph is a core domain for troubleshooting relationships between entities. Behind each node of the dependency graph, the resolver graph is used to identify the particular entity and associated metric of the data center that corresponds to the node. For example, application latency 2201 depends on the traffic drop rate 2205 as indicated by edge 2208 and depends on the traffic rate 2204 as indicated by edge 2206. The resolver graph contains a list of the routers used by the application. The resolver graph is used to identify a specific router that is represented by the network element 1904 and retrieve the traffic rate metric 2204 and traffic drop rate metric 2205 associated with the router from a data file.

Figure 23:
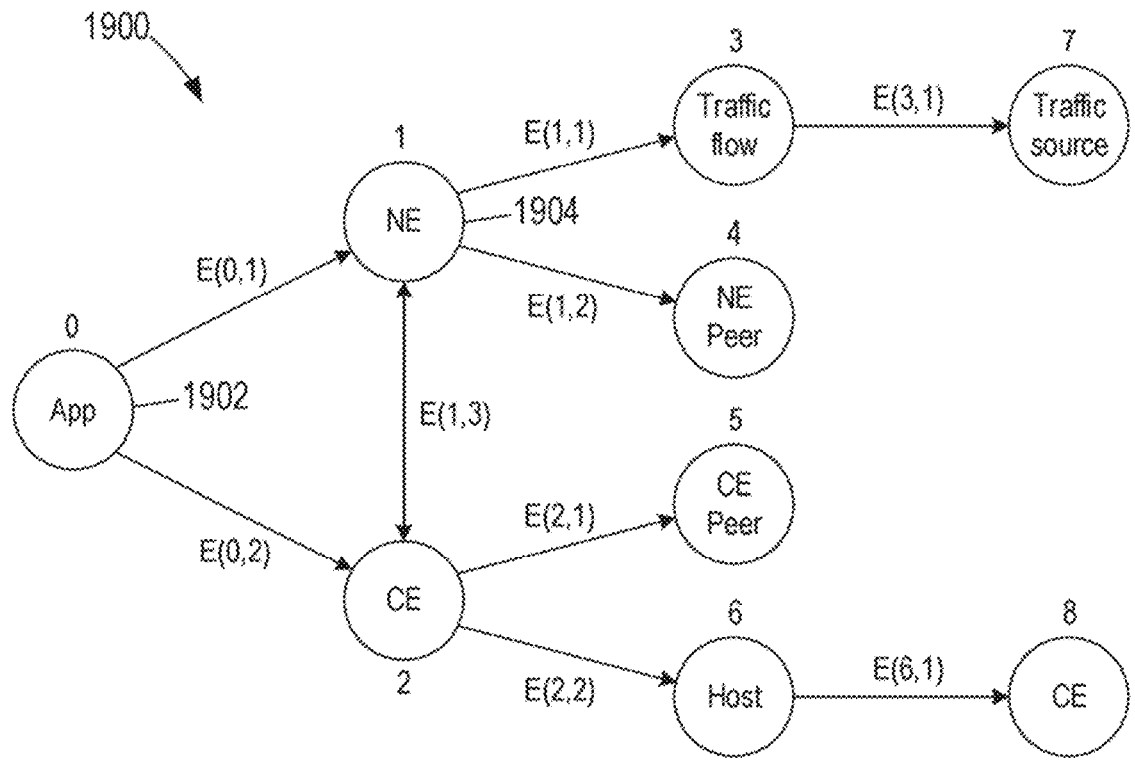
FIG. 23 shows the dependency graph in FIG. 19A.

FANTA evaluates each edge of dependency graph to identify correlated combinations of metrics and alerts of dependent and independent nodes. FIG. 23 shows the dependency graph 1900 with the nodes indexed 0 through 8. For example, the application node 1902 is index 0 and the network element node 1904 is index 1. Each of the edges are denoted by E(dependent_index, independent_index). FANTA evaluates each edge of the dependency graph for correlated metrics and alerts based on the amount of mutual information in anomalous points and change points in each pair of metrics and alerts associated with each edge of the dependency graph.

Figure 24:
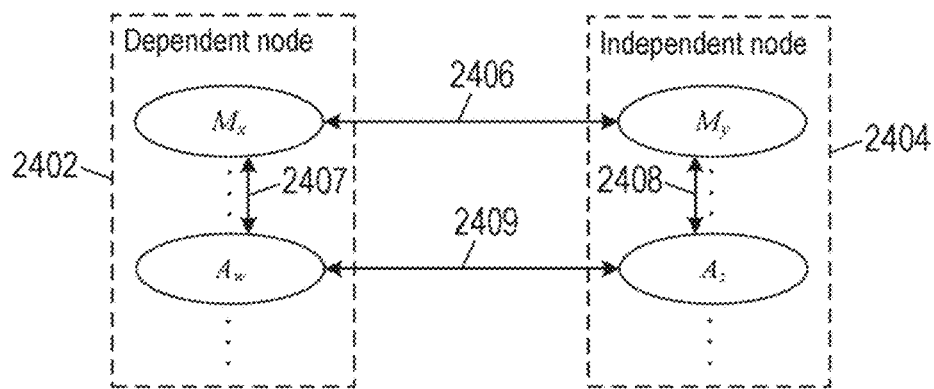
FIG. 24 shows an example of a dependent node and an independent node of a dependency graph.

FIG. 24 shows an example of a dependent node 2402 and an independent node 2404 of a dependency graph (not shown). Dependent node 2402 has a metric denoted by $M_x$ and an alert denoted by $A_w$. Independent node 2404 has a metric denoted by $M_y$ and an alert denoted by $A_z$. Metrics at nodes connected by an edge may have an implicit dependency. Alerts at nodes connected by an edge may also have an implicit dependency. The metrics of each node have an implicit dependency on the alerts recorded for that node. FANTA computes mutual information for combination of metrics and alerts of dependent and independent nodes as represented by directional arrows 2406-2409. For example, mutual information denoted by $I_{xy}$ is computed for the pair of metrics $M_x$ and $M_y$ 2406. Mutual information denoted by $I_{xw}$ is computed for the metric $M_x$ and the alert $A_w$ combination 2407 of the dependent node 2402. Mutual information denoted by $I_{yz}$ is computed for the metric $M_y$ and the alert $A_z$ combination 2408 of the independent node 2404. Mutual information denoted by $I_{wz}$ is computed for the pair of alerts $A_w$ and $A_z$ 2409.

FANTA computes the mutual information for the different combinations of metrics and alerts generated in a time interval denoted by $[t_S, t_A]$, where $t_S$ denotes the beginning of the time interval and $t_A$ denotes the end of the time interval. The time point $t_A$ may be the time when anomalous behavior is detected in application, such the time points described above with reference to FIGS. 16 and 17. Alternatively, time point $t_A$ may be the time when a user clicks on the TROUBLESHOOT button in FIG. 18. The time point $t_S$ is determined by a preset duration for the time interval $[t_S, t_A]$, where $t_S = t_A - D$ and D is preset duration. For example, the duration D may be preset to 30 minutes, 1 hour, 6 hours, 24 hours, a week, or even a month.

FANTA evaluates each pair of metrics of dependent and independent nodes for correlation in the time interval based on interesting time points each pair of metrics have in common. The interesting time points include anomalous time points (i.e., anomalous points) which are time points in which anomalies occur in a metric and change time points (i.e., change points) which are time points when a metric shifts from a range of metrics values to a different range of metric values.

FANTA detects anomalous points by maintaining a moving average and a moving standard deviation on run-time metric values of each metric. FANTA computes a moving average according to Equation (3a) and a moving standard deviation according to Equation (3b) of metric values with time points in a sliding time window, where N is the number of metric values in the sliding time window. When a run-time metric value $y_{rt}$ is generated, FANTA computes a Score of the run-time metric value $y_{rt}$:

$$Z(y_{rt}) = \frac{|y_{rt} - \mu|}{\sigma} \tag{4a}$$

The Z score is a value that indicates how many standard deviations the run-time metric value $y_{rt}$ is from the mean of the metric values in the sliding time window. When the Score satisfies the following condition $$Z(y_{rt}) > B\sigma_i \tag{4b}$$

where B is the number of standard deviations (e.g., B=2 or 3),
the time point $t_{rt}$ of the run-time metric value $y_{rt}$ is identified as an anomalous point.

Figure 25:
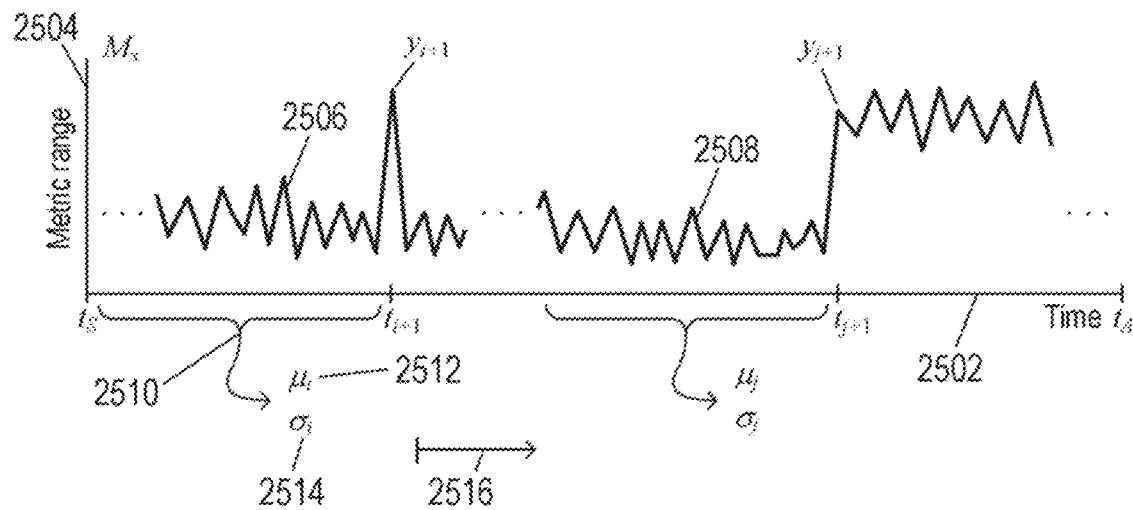
FIGS. 25-26 show an example of computing a score and applying a two-sample Student T-test on metric values in a sliding time window.

FIG. 25 shows an example of computing a moving average and a moving standard deviation in a sliding time window of run-time metric values of the metric $M_x$. Horizontal axis 2502 represents the time interval $[t_S, t_A]$. Vertical axis 2504 represents a range of metric values for the metric $M_x$. Curves 2506 and 2508 represent metric values of the metric $M_x$ recorded over different periods of time within the time interval $[t_S, t_A]$. Bracket 2510 represents a sliding time window. FANTA computes a moving average 2512 according to Equation (3a) and a moving standard deviation 2514 according to Equation (3b) of metric values with time points in the sliding time window 2510. For a run-time metric value $y_{i+1}$, FANTA computes a Score $Z(y_{i+1})$. In this example, the run-time metric value $y_{i+1}$ is a jump from metric values the sliding time window 2510 as indicated by $Z(y_{i+1}) > B\sigma_i$. As a result, corresponding time point $t_{i+1}$ of the run-time metric value is identified as an anomalous point. Directional arrow 2516 represents advancement of the sliding time window 2510. For a run-time metric value $y_{j+i}$, FANTA computes a Score $Z(y_{j+1})$. In this example, the run-time metric value $y_{j+1}$ is another jump with $Z(y_{j+1}) > B\sigma_j$. As a result, corresponding time point $t_{j+1}$ is identified as an anomalous point. When the TROUBLESHOOT button is clicked the anomalous points are retrieved from data storage for the time interval $[t_S, t_A]$.

FANTA detects change points by performing a two-sample Student T-test on run-time metric values of each metric in a sliding time window. FANTA first applies a median filter to smooth metric values in the sliding time window (i.e., remove spikes in the metrics). The two-sample Student T-test is computed by partitioning the sliding time window into adjacent time intervals called a left-hand interval and a right-hand interval. Each interval has a distribution of metric values. The Student T-test is used to determine if there is a statistical difference between the two distributions. The T-value of the distributions is computed as follows:

$$T = \frac{|\mu_R - \mu_L|}{\sqrt{\frac{\sigma_R}{N_R} + \frac{\sigma_L}{N_L}}} \tag{5a}$$

where
$\mu_L$ is the average of metric values in a left-hand time interval;
$\sigma_L$ is the standard deviation of metric values in the left-hand time interval;
$N_L$ is the number of metric values in the left-hand time interval;
$\mu_R$ is the average of metric values in the right-hand time interval;
$\sigma_R$ is the standard deviation of metric values in the right-hand time interval; and
$N_R$ is the number of metric values in the right-hand time interval.

A user preselects a p-value (e.g., a user may select a p-value of 0.01, 0.02, or 0.05) and based on the number of degrees of freedom given by, $N_L + N_R - 2$, assigns a critical value denoted by $\alpha$. Table of critical values for different p-values and degrees of freedom is given as follows:

| Table of Critical Values α | | | |
|---|---|---|---|
| Degrees of Freedom | p = 0.01 | p = 0.02 | p = 0.05 |
| 100 | 2.626 | 2.346 | 1.984 |
| 200 | 2.601 | 2.345 | 1.972 |
| 300 | 2.586 | 2.339 | 1.968 |

The T-test is performed by comparing the T-value in Equation (5a) to the critical value. When the T-value satisfies the following condition $$T > \alpha \quad (5b)$$

there is a statistical difference between the averages of the distributions in the left-hand and right-hand time intervals. In other words, the metric values in the right-hand time interval have shifted away from the metric values in the left-hand time interval and there is a change point between the left-hand time interval and the right-hand time interval. In one implementation, the change point is the earliest time point of the right-hand time interval. In another implementation, the change point is the latest time point of the left-hand time interval. In another implementation, the change point is the time point between the earliest time point of the right-hand time interval and the latest time point of the left-hand time interval.

Figure 26:
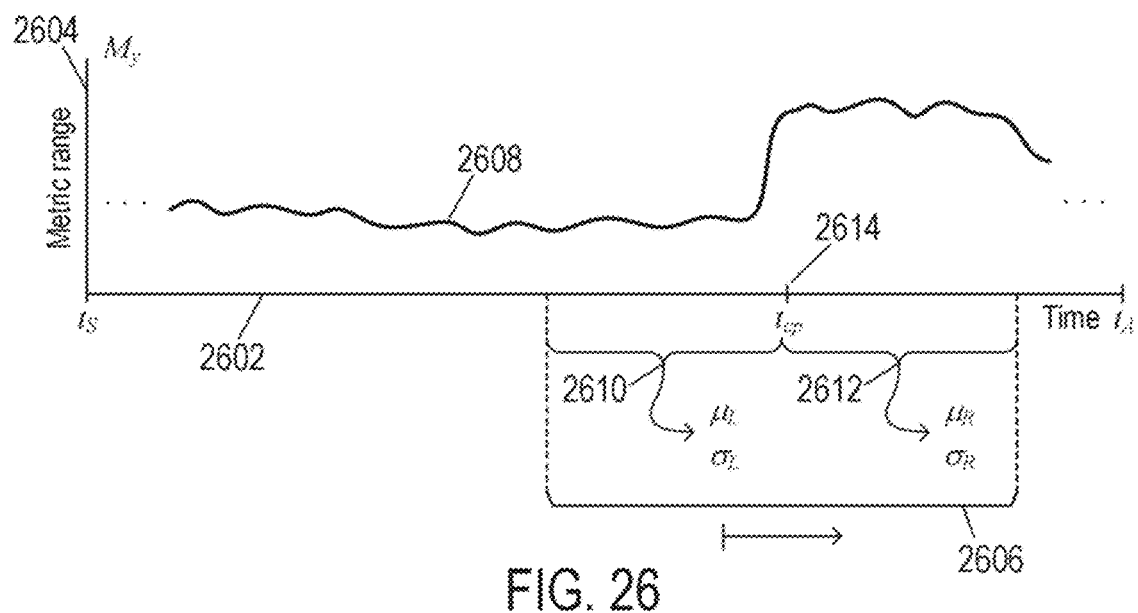

FIG. 26 shows an example of using the T-test to identify a change point in run-time metric values of the metric $M_y$. Horizontal axis 2602 represents the time interval $[t_S, t_A]$. Vertical axis 2604 represents a range of metric values for the metric $M_y$. The metric values in sliding time window 2606 are smoothed using a median filter to remove spiked metric values. Curve 2608 represents smoothed metric values of the metric $M_y$. The sliding time window 2606 is partitioned into a left-hand time interval 2610 and a right-hand time interval 2612. A left-handed average $\mu_L$ and a left-handed standard deviation $\sigma_L$ are computed from the metric values in the left-hand time interval 2610. A right-handed average $\mu_R$ and a right-handed standard deviation $\sigma_R$ are computed from the metric values in the right-hand time interval 2612. A T-value is computed for the two distributions of metric values in the left-hand and right-rand intervals 2610 and 2612 as described above with reference to Equation (5a). In this example, the T-value is greater than the critical value in Equation (5b). A change point 2614 is the earliest time point of the right-hand time interval 2612. When the TROUBLESHOOT button is clicked the change points are retrieved from data storage for the time interval $[t_S, t_A]$.

In a post processing step, FANTA deletes non-interesting change points. A change point that corresponds to less than an X % change in magnitude of a metric from the most recent time point of the left-hand time interval is not an interesting change point and is deleted. For example, X % may be 5% or 10% for CPU and memory and 2.5% for data packet drop rates.

After anomalous points have been identified for the metrics $M_x$ and $M_y$, FANTA computes mutual information for the metrics $M_x$ and $M_y$ over the time interval $[t_S, t_A]$ based on the number of anomalous points identified for the metrics $M_x$ and $M_y$ in the time interval $[t_S, t_A]$. The mutual information for the metrics $M_x$ and $M_y$ over the time interval $[t_S, t_A]$ is given by $$I_{xy} = \log\left(\frac{p(x, y)}{p(x)p(y)}\right) \quad (6)$$

where p(x) is the probability of anomalous points and/or changes points in the metric $M_x$ over the time interval $[t_S, t_A]$;

p(y) is the probability of anomalous points and/or changes points in the metric $M_y$ over the time interval $[t_S, t_A]$; and p(x, y) is the joint probability of anomalous points and/or changes points in the metrics $M_x$ and $M_y$ over the time interval $[t_S, t_A]$.

The probabilities p(x), p(y), and p(x, y) are computed by first partitioning the time interval $[t_S, t_A]$ into J sub-intervals denoted by $$[t_S, t_A] = [t_0, t_1) \cap [t_1, t_2) \cap \ldots \cap [t_{j-1}, t_j) \cap \ldots \cap [t_{j-1}, t_j]$$

where $t_0 = t_S$; and $t_J = t_A$.

The sub-intervals can be, for example, 30 seconds, 1 minute, or 5 minutes in duration. In one implementation, FANTA computes the number of sub-intervals, $n_x^A$, that contain anomalous points for the metric $M_x$, the number of sub-intervals, $n_y^A$, that contain anomalous points for the metric $M_y$, and the number of sub-intervals, $n_{xy}^A$, that contain anomalous points for both of the metrics $M_x$ and $M_y$. The probabilities are computed by $$p(x) = \frac{n_x^A}{J}$$

$$p(x) = \frac{n_x^A}{J}$$

$$p(y) = \frac{n_y^A}{J}$$

and $$p(x, y) = \frac{n_{xy}^A}{J}$$

In another implementation, FANTA computes the probabilities p(x), p(y), and p(x, y) based on anomalies and change point. For example, FANTA computes the number of sub-intervals, $n_x^A$, that contain interesting points for the metric $M_x$, the number of sub-intervals, $n_y^A$, that contain interesting points for the metric $M_y$, and the number of sub-intervals, $n_{xy}^A$, that contain interesting points for both of the metrics $M_x$ and $M_y$.

FANTA computes mutual information for different combinations of pairs of metrics and alerts associated with each edge of the dependency graph are described below with reference to FIGS. 24-26 and Equations (6) and (7). The mutual information computed in Equation (6) is a measure of the degree of similarity or correlation between the metrics $M_x$ and $M_y$ over the time interval $[t_S, t_A]$. When the mutual information of Equation (6) satisfies the following condition:

$$I_{xy} > Th_I \quad (7)$$

where $Th_I$ is a mutual information threshold, the metrics $M_x$ and $M_y$ are correlated.

Figures 27A, 27B:
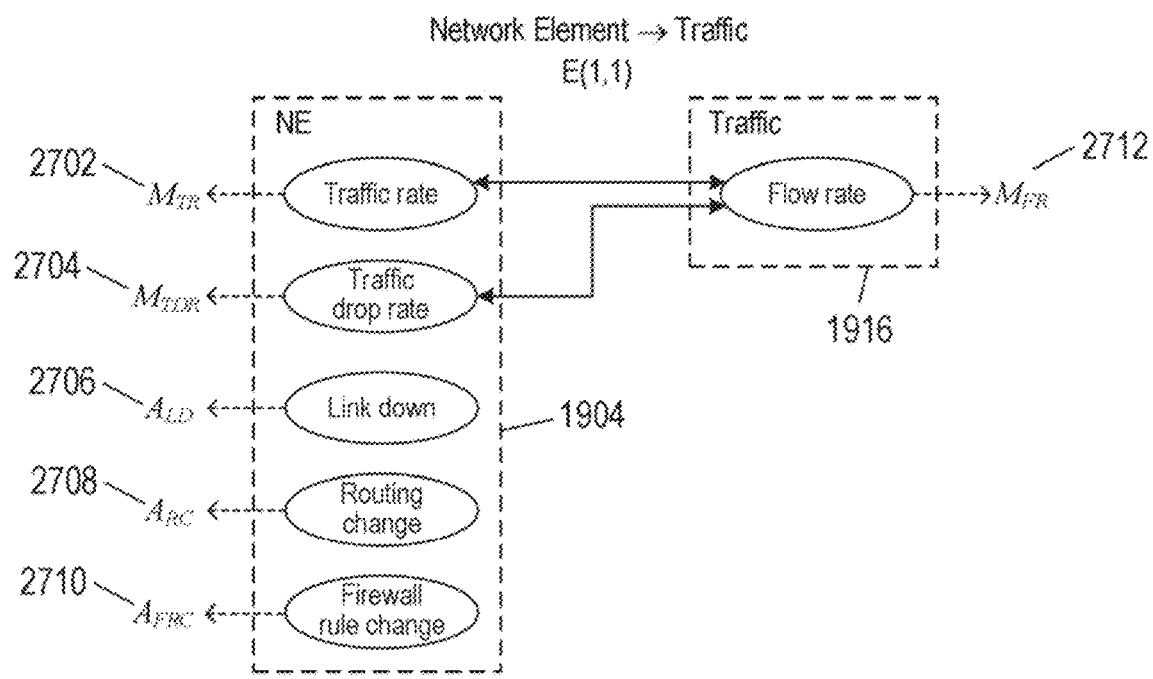
FIGS. 27A-27B show an example of the metrics and alerts associated with a network element node and a traffic node of a dependency graph.

FIG. 27A shows an example of the metrics and alerts associated with network element node 1904 and traffic node 1916 of the dependency graph 1900. The network element node 1904 (e.g., a router) has a traffic rate metric denoted by $M_{TR}$ 2702 and a traffic drop rate metric denoted by $M_{TDR}$ 2704. The network element node 1904 also has associated alerts. For example, the network element node 1904 has a lock down alert denoted by $A_{LD}$ 2706, a routing change alert denoted by $A_{RC}$ 2708, and a firewall rule change 2710 denoted by $A_{FRC}$ 2710. The traffic node 1916 has a flow rate metric denoted by $M_{FR}$ 2712. FIG. 27B shows a table of mutual information computed for different combinations of metrics and alerts of the network element node 1904 and the traffic node 1916. For example, table entry 2714 is the mutual information, denoted by $I_{FR,TR}$, between the flow rate metric $M_{FR}$ of the traffic node 2712 and the traffic rate metric $M_{TR}$ of the network element node 1904.

FANTA is an automated troubleshooting framework built on top of the dependency graph, resolved node entities, and determining correlations between dependent and independent nodes. FANTA performs on automated graph traversal of the dependency graph with a defined stopping criterion. For example, the dependency graph may be traversed using a breadth first search technique, or in an alternative implementation, a depth search technique. Graph traversal stops at the leaf nodes. The table in FIG. 21 displays the metrics for each node in the dependency graph. For each edge in the dependency graph, FANTA computes correlations of the metrics and alerts of the independent and dependent across an edge as described above with reference to Equations (6) and (7). The dependency graph is traversed by starting from the application node 1902, perform correlation analysis of the metric-metric, metric-alert, and alert-alert pairs at each edge as described above with reference to FIGS. 25-29. FANTA outputs paths in the dependency graph with successful correlations. The dependency graph is displayed in a graphical user interface ("GUIs") with paths identifying the type of problem occurring at each node. For example, the GUI may display a resolved dependency graph with paths highlighted and nodes labeled with the errors identified in the table of FIG. 20. The output dependency graph identifies a chain of problems at each node leading from the application node to the farthest node away from the application with a problem. The farthest node in the chain is most likely the root cause of the problem at the application node. The chain of problems identified in the GUI enables a user to track how a problem at the farthest node creates a series of problems that lead to the application node.

Figure 28:
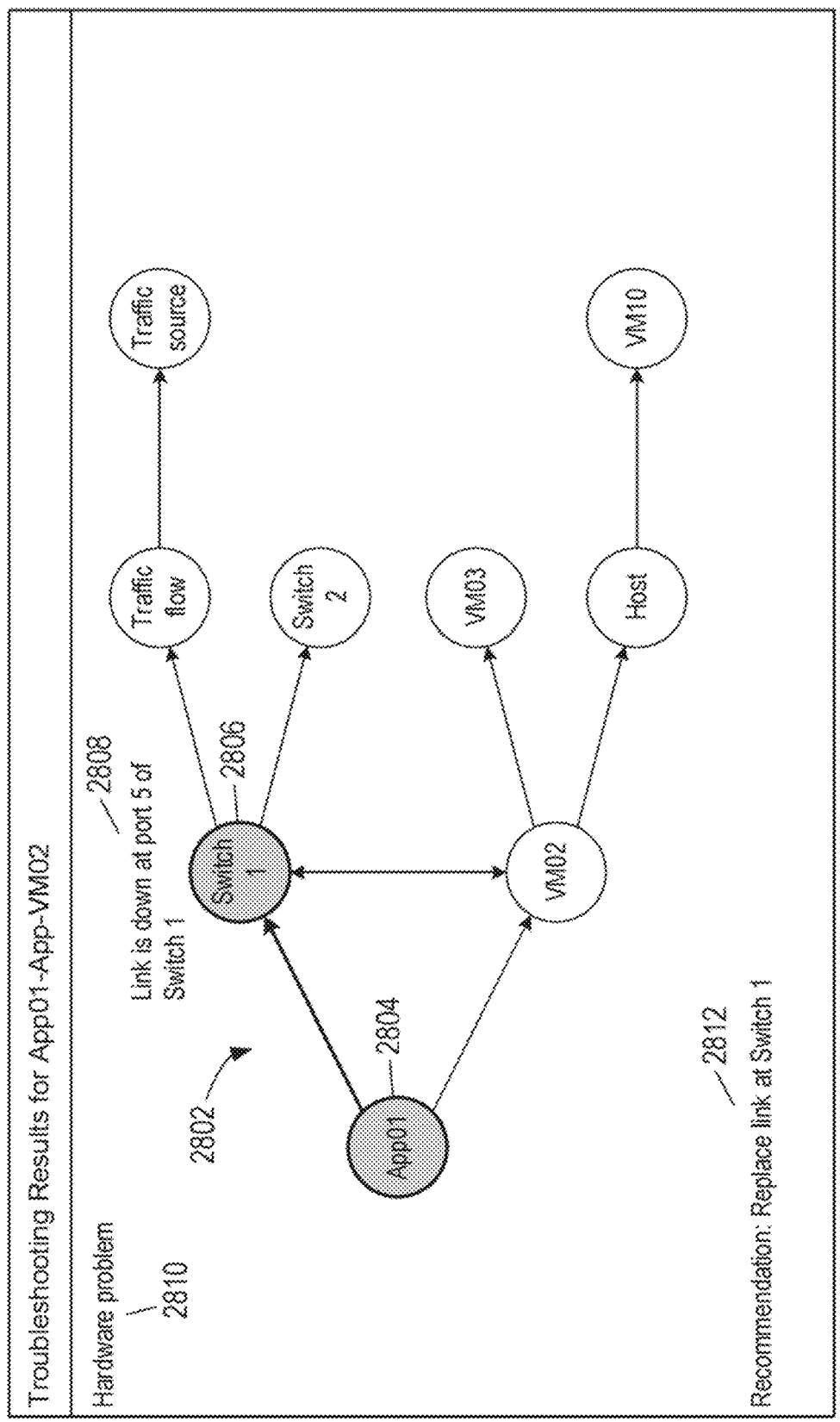
FIGS. 28-30 show example GUIs with a resolved dependency graph and examples of paths highlighted to identify three categories of root causes of problems.
Figure 29:
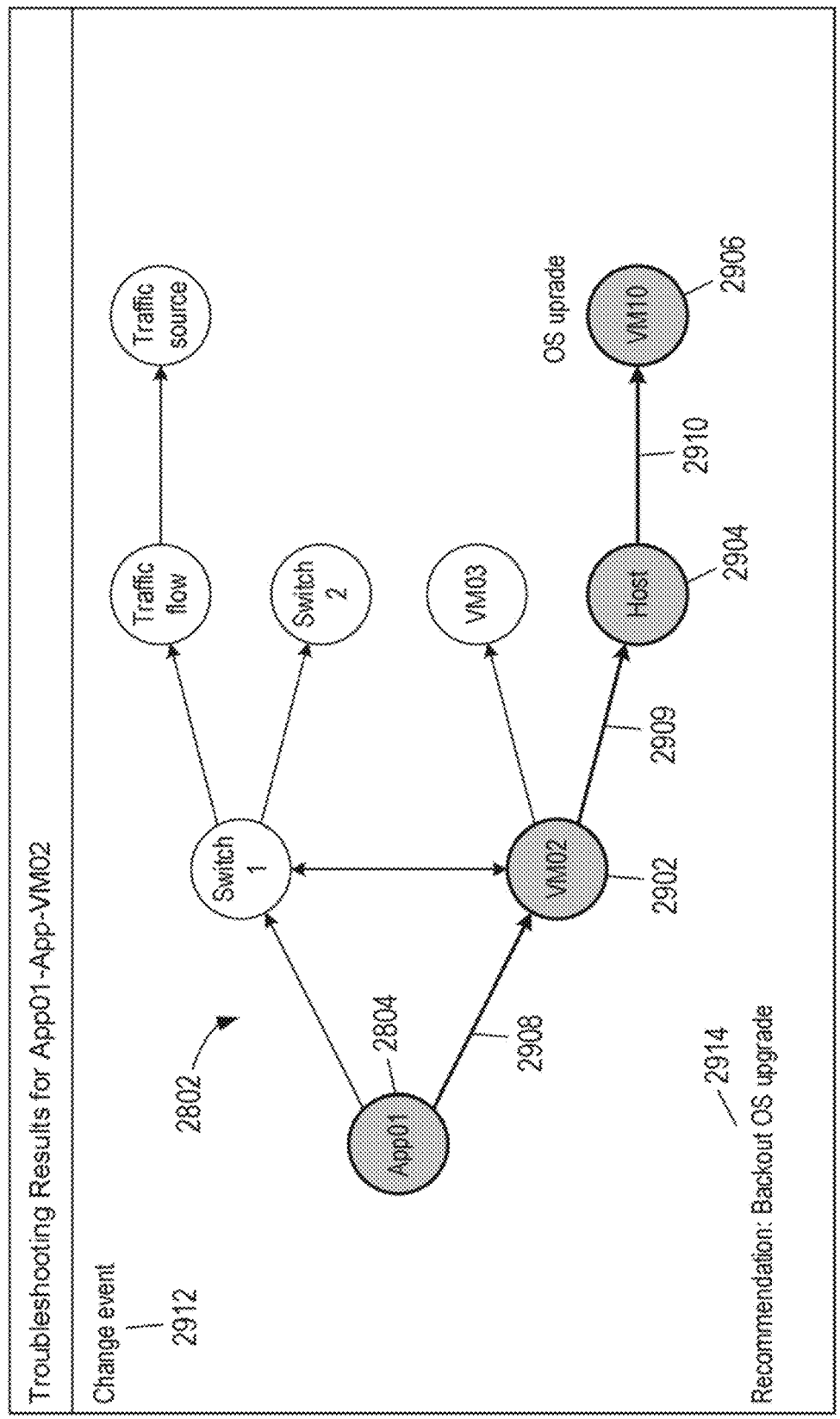
Figure 30:
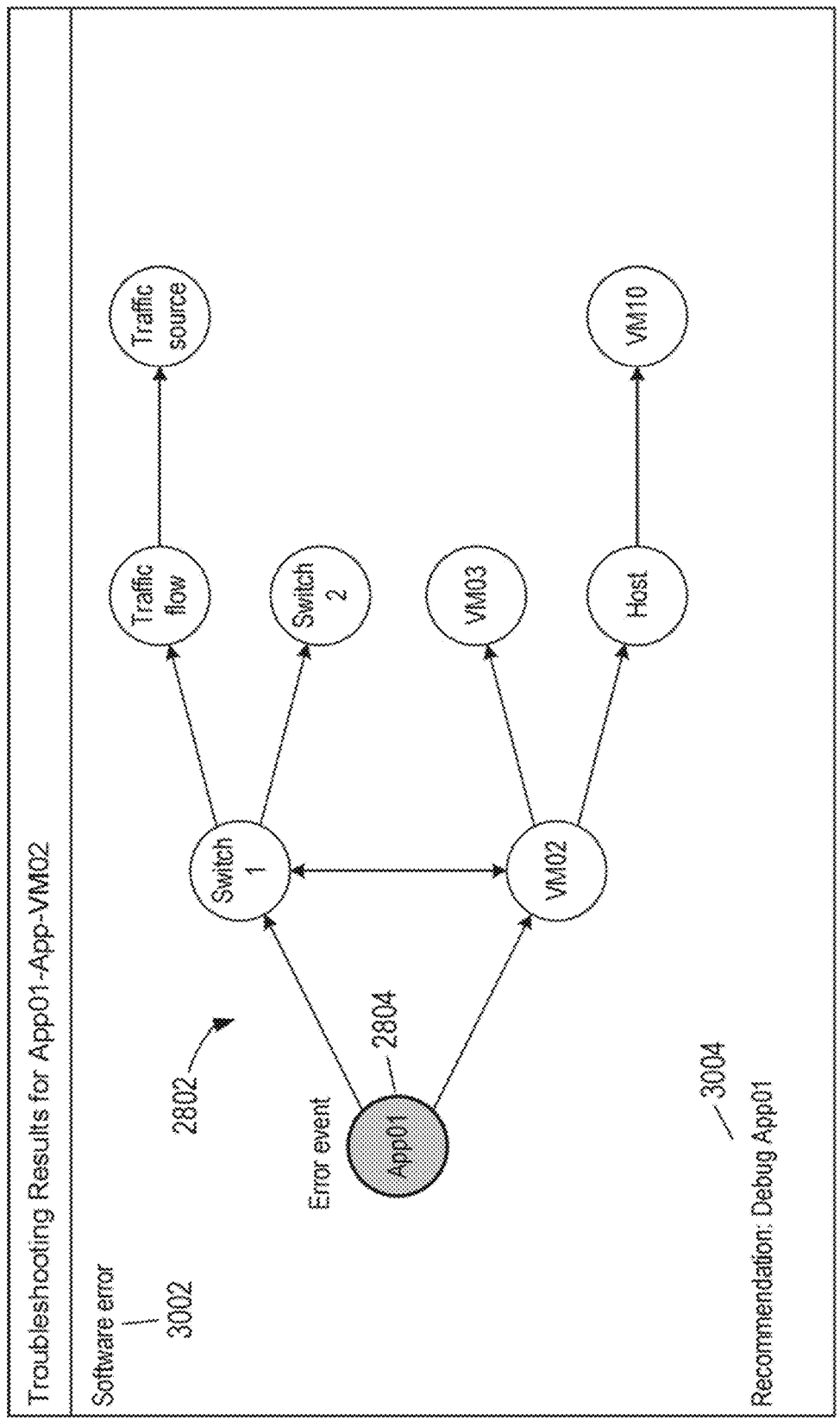

FIGS. 28-30 show example GUIs with a resolved dependency graph and examples of paths highlighted to identify the three categories of root causes of problems. In FIG. 28, a GUI displays a resolved dependency graph 2802. The application node 2804 and the network element node 2806 are highlighted and the edge 2808 connecting the application node 2804 and the network element node 2806 is bolded identifying the root cause. In this example, the traffic rate metric at a port 5 of Switch 1 is correlated with a link down alert. The GUI displays the port number and identifies the switch 2808. Because a down link is a hardware problem, the GUI identifies the category of the problem as a hardware problem 2810. In certain implementations, the GUI may display a recommendation 2812 to resolve the root cause of the problem.

In FIG. 29, a GUI displays the resolved dependency graph 2802. In this example, the application node 2804, compute element node 2902, host node 2904, and compute element node 2906 are highlighted and the edges 2908-2910 connecting the nodes 2804, 2902, 2904, and 2906 are bolded identifying the dependencies of the root cause of the problem. In this example, an OS upgrade at the leaf node 2906 is identified as the root cause of the problem at application node 2804. In other words, the alert for the guest OS upgrade at the VM10 is correlated with one or more metrics and/or alerts of the host node 2904, which are in turn correlated with metrics and/or alerts of the node 2902. Because an OS upgrade is a change event, the GUI identifies the category of the problem as a change event 2912. In certain implementations, the GUI may display a recommendation 2914 to resolve the root cause of the problem.

In FIG. 30, a GUI displays the resolved dependency graph 2802. In this example, only the application node 2804 is highlighted. None of the metrics and alerts of the other nodes are correlated. Metrics of the application are correlated with the error rate metric of the application. The root cause of the problem is categorized as a software error 3002. The GUI also displays a recommendation 3004 to resolve the root cause of the problem.

The method described below with reference to FIGS. 31-36 is executed by the network management server that is stored in one or more data-storage devices as machine-readable instructions and executed by one or more processors of a computer system, such as the computer system shown in FIG. 1.

Figure 31:
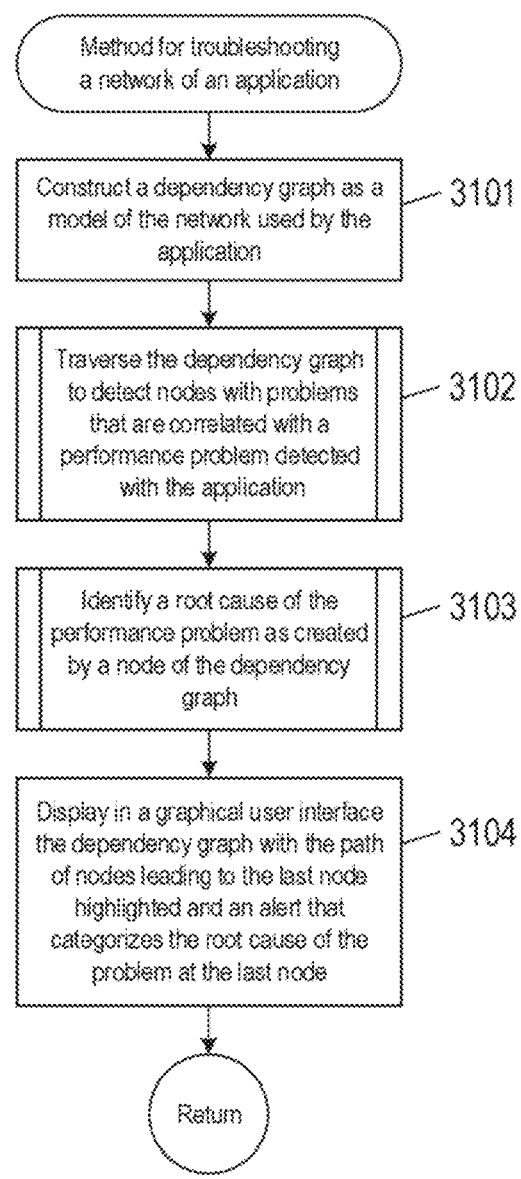
FIG. 31 is a flow diagram of a method for troubleshooting a network of an application.

FIG. 31 is a flow diagram of a method for troubleshooting a network of an application. In block 3101, a dependency graph as a model of the network used by the application is constructed using a network management server. In block 3102, a "traverse the dependency graph to detect nodes with problems that are correlated with a performance problem detected with application" procedure is performed. An example implementation of the "traverse the dependency graph to detect nodes with problems that are correlated with a performance problem detected with application" procedure is described below with reference to FIG. 32. In block 3103, an "identify a root cause of the performance problem as created by a node of the dependency graph" procedure is performed. An example implementation of the "identify a root cause of the performance problem as created by a node of the dependency graph" procedure is described below with reference to FIG. 36. In block 3104, a graphical user interface displays the dependency graph with the nodes that are correlated with the performance problem highlighted and an alert that categorizes the root cause of the problem created by the node.

Figure 32:
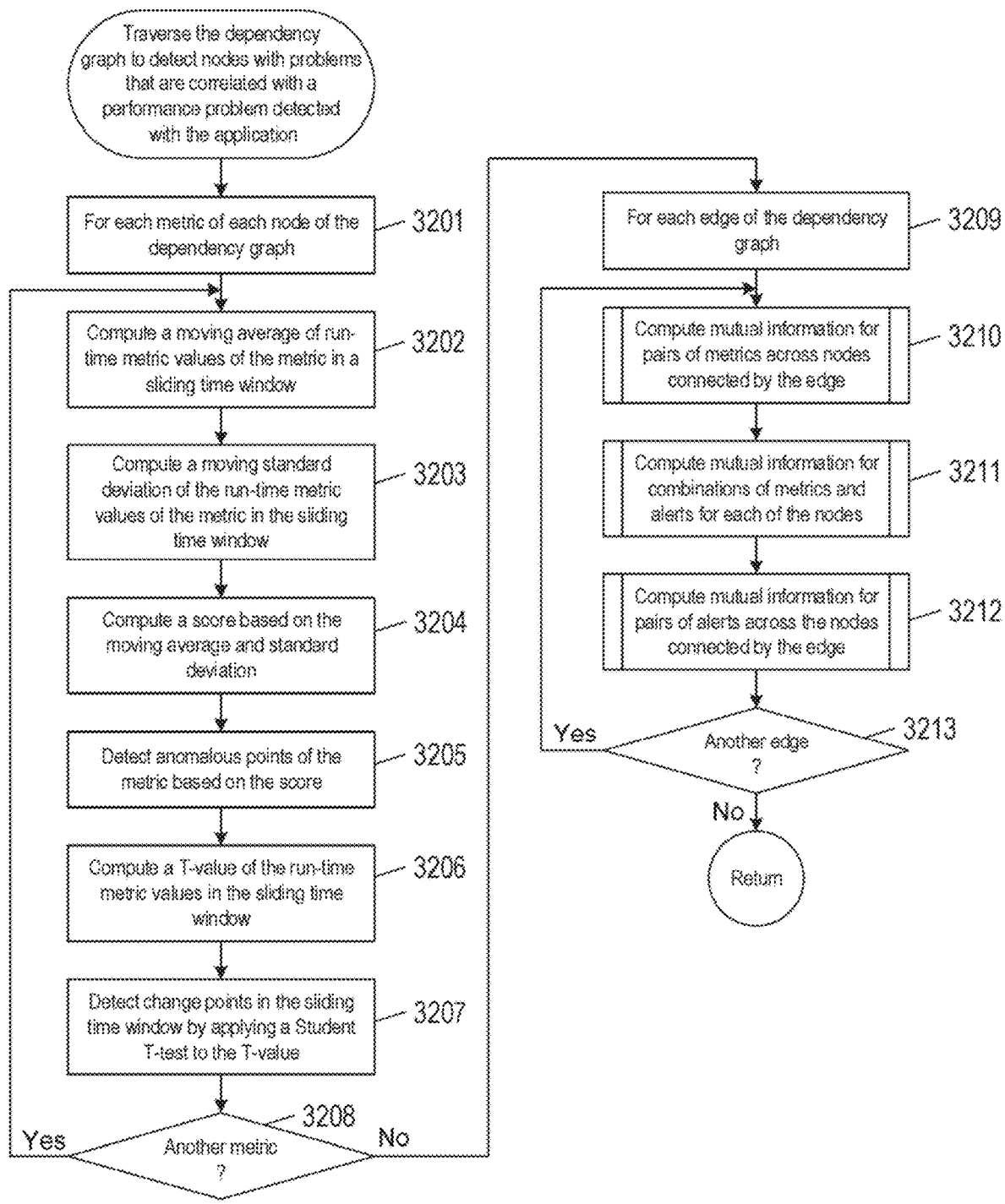
FIG. 32 is a flow diagram of an example implementation of "traverse the dependency graph to detect nodes with problems that are correlated with a performance problem detected with application" procedure performed in FIG. 31.

FIG. 32 is a flow diagram of an example implementation of "traverse the dependency graph to detect nodes with problems that are correlated with a performance problem detected with application" procedure performed in block 3102 of the FIG. 31. A loop beginning with block 3201 repeats the operations represented by block 3202-3207 for each metric of each node of the dependency graph. In block 3202, a moving average of run-time metric values of the metric is computed in a sliding time window. In block 3203, a moving standard deviation of run-time metric values of the metric is computed in a sliding time window. In block 3204, a Score is computed based on the moving average and moving standard deviation as described above with reference to Equation (4a). In block 3205, the Score is used to detect anomalous points in the metric as described above with reference to Equation (4b). In block 3206, a T-value is computed for run-time metric values of the metric in the sliding window as described above with reference to Equation (5a). In block 3207, change points in the sliding time window are detected using the Student T-test as described above with reference to Equation (5b). In decision block 3208 the operations in blocks 3202-3207 are repeated for each metric. A loop beginning with block 3209 repeats the computational operations represented by blocks 3210-3212 for each edge of the dependency graph. In block 3210, a "compute mutual information for pairs of metrics across nodes connected by the edge" procedure is performed. An example implementation of the "compute mutual information for pairs of metrics across nodes connected by the edge" procedure is described below with reference to FIG. 33. In block 3211, a "compute mutual information for combinations of metrics and alerts for each of the nodes" procedure is performed. An example implementation of the "compute mutual information for combinations of metrics and alerts for each of the nodes" procedure is described below with reference to FIG. 34. In block 3212, a "compute mutual information for pairs of alerts across nodes connected by the edge" procedure is performed. An example implementation of the "compute mutual information for pairs of alerts across nodes connected by the edge" procedure is described below with reference to FIG. 35. In decision block 3213, the operations represented by blocks 3210-3212 are repeated for another edge.

Figure 33:
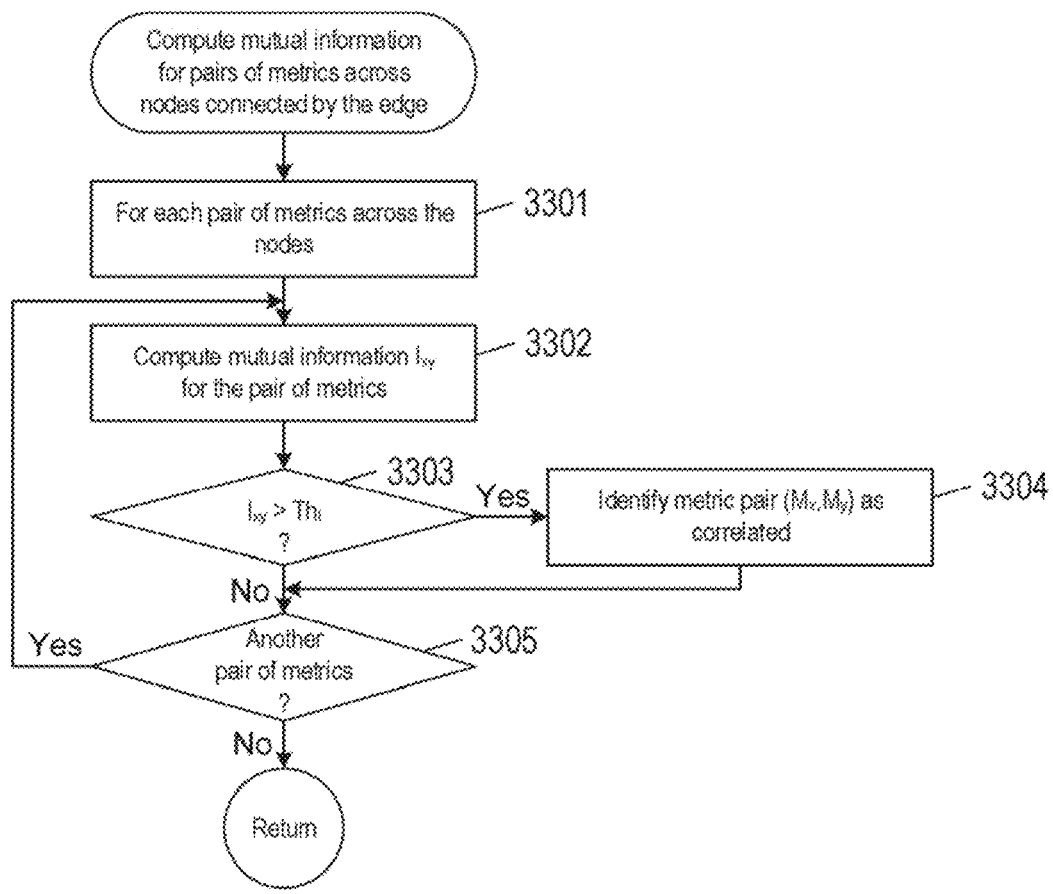
FIG. 33 is a flows diagram of the "compute mutual information for pairs of metrics across nodes connected by the edge" procedure performed in FIG. 32.

FIG. 33 is a flows diagram of the "compute mutual information for pairs of metrics across nodes connected by the edge" procedure is performed in block 3210 of FIG. 32. A loop beginning with block 3301 repeats the computational operations of blocks 3302-3304 for each pair of metrics across the dependent and independent nodes. In block 3302, mutual information is computed as described above with reference to Equation (7a). In decision block 3303, when the mutual information satisfies the condition in Equation (7b), control flows to block 3304 in which the pair of metrics are identified as correlated. In decision block 3305, the operations represented by blocks 3302-3304 are repeated for another pair of metrics.

Figure 34:
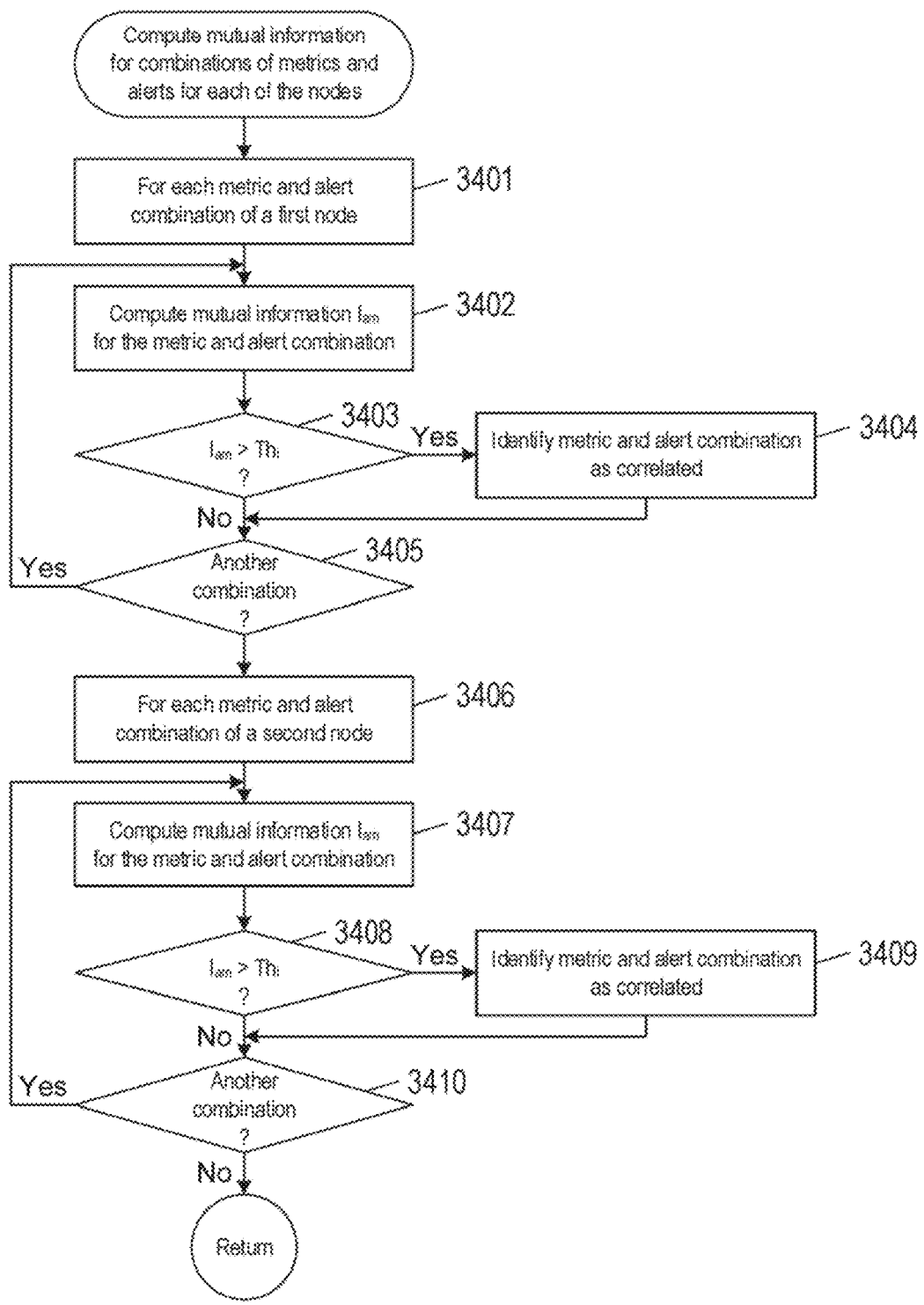
FIG. 34 is a flow diagram of the "compute mutual information for combinations of metrics and alerts for each of the nodes" procedure performed in FIG. 32.

FIG. 34 is a flow diagram of the "compute mutual information for combinations of metrics and alerts for each of the nodes" procedure is performed in block 3211 of FIG. 32. A loop beginning with block 3401 repeats the operations represented by blocks 3402-3404 metric and alert combination of the dependent node. In block 3402, mutual information is computed. In decision block 3403, when the mutual information satisfies the condition in Equation (7), control flows to block 3404 in which the metric and alert combination is identified as correlated. In decision block 3405, the operations represented by blocks 3402-3404 are repeated for another metric and alert combination. A loop beginning with block 3406 repeats the operations represented by blocks 3407-3407 metric and alert combination of the independent node. In block 3407, mutual information is computed. In decision block 3408, when the mutual information satisfies the condition in Equation (7), control flows to block 3409 in which the metric and alert combination is identified as correlated. In decision block 3410, the operations represented by blocks 3407-3409 are repeated for another metric and alert combination.

Figure 35:
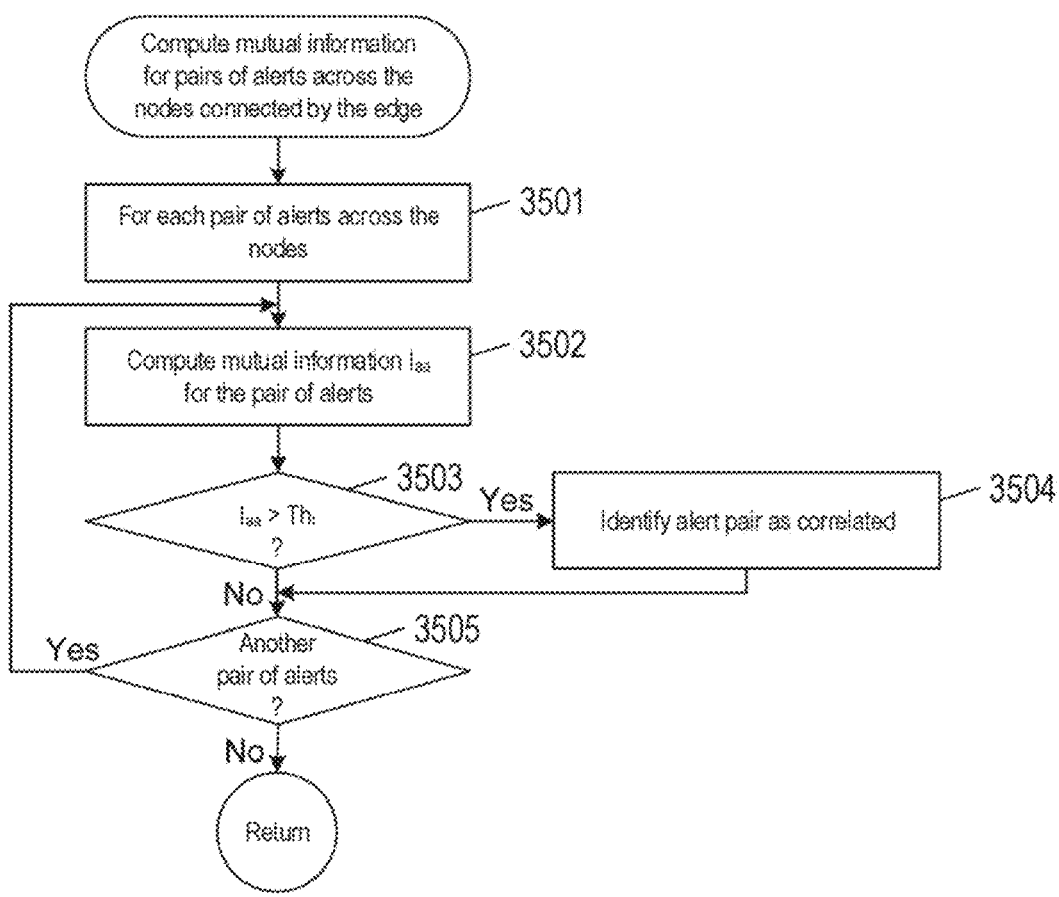
FIG. 35 is a flows diagram of the "compute mutual information for pairs of alerts across nodes connected by the edge" procedure performed in FIG. 32.

FIG. 35 is a flows diagram of the "compute mutual information for pairs of alerts across nodes connected by the edge" procedure is performed in block 3210 of FIG. 32. A loop beginning with block 3501 repeats the computational operations of blocks 3502-3504 for each pair of alerts across the dependent and independent nodes. In block 3502, mutual information is computed. In decision block 3303, when the mutual information satisfies the condition in Equation (7), control flows to block 3304 in which the pair of alerts are identified as correlated. In decision block 3305, the operations represented by blocks 3402-3304 are repeated for another pair of metrics.

Figure 36:
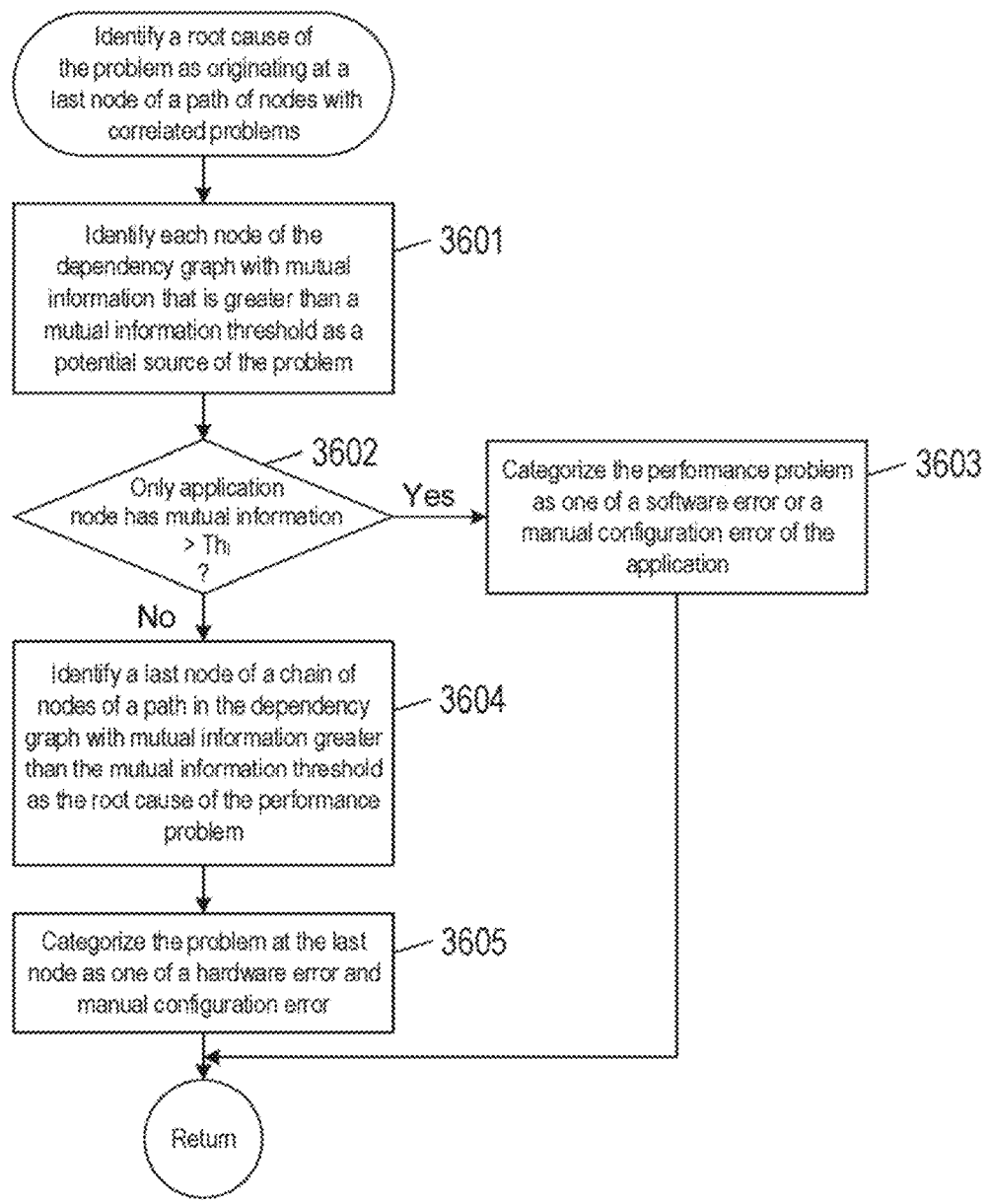
FIG. 36 is a flow diagram of the "identify a root cause of the performance problem as created by a node of the dependency graph" procedure performed in FIG. 31.

FIG. 36 is a flow diagram of the "identify a root cause of the performance problem as created by a node of the dependency graph" procedure is performed in block 3104 of FIG. 31. In block 3601, each node of the dependency graph with mutual information that is greater than a mutual information threshold is identified as a potential root cause of the problem. In decision block 3602, when only the application node has mutual information greater than the mutual information threshold, control flows to block 3603. In block 3603, the performance problem is categorized as one of a software error and change point. In block 3604, a last node of a chain of nodes of a path in the dependency graph with mutual information greater than the mutual information threshold is identified as the root cause of the performance problem. In block 3605, the problem at the last node is identified as one of hardware error, a software error, or a change point.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An automated computer-implemented process for troubleshooting a network used by an application running in a data center, the process comprising:
   constructing a dependency graph as a model of the network of entities of the data center that send data to and receive data from the application, wherein nodes of the dependency graph represent the application and the entities of the network;
   traversing the dependency graph to detect nodes with problems that are correlated with a performance problem with the application by identifying anomalous points and change points in metrics of each node and identifying correlated combinations of metrics and alerts for each edge of the dependency graph;
   identifying a root cause of the performance problem as created by a node of the dependency graph as one of a manual configuration error, a hardware error, and a software error based on the nodes with metrics and alerts that are correlated with the performance problem; and
   displaying in a graphical user interface the dependency graph with the nodes that are correlated with the performance problem highlighted and an alert that identifies the root cause of the problem created by the node as a manual configuration error, a hardware error, or a software error, thereby identifying the root cause of the performance problem with the application.

2. The process of claim 1 wherein traversing the dependency graph to detect nodes with problems that are correlated with the performance problem comprises:
   for each metric of each node of the dependency graph,
      computing a moving average of run-time metric values of the metric in a sliding time window,
      computing a moving standard deviation of the run-time metric values of the metric in the sliding time window,
      computing a Score for the run-time metric values of the metric in the sliding time window based on the moving average and the moving standard deviation,
      detecting anomalous points of the metric based on the Score,
      computing a T-value of the run-time metric values in the sliding time window, and detecting change points in the sliding time window by applying a Student T-test to the T-value.

3. The process of claim 1 wherein traversing the dependency graph to detect nodes with problems that are correlated with the performance problem comprises:
for each edge of the dependency graph,
computing mutual information for each pair of metrics across dependent and independent nodes connected by the edge,
computing mutual information for each metric and alert combination at the dependent node and at the independent node connected by the edge, and
computing mutual information for each pair of alerts across the dependent and independent nodes connected by the edge.

4. The process of claim 2 wherein computing mutual information for each pair of metrics across the dependent and independent nodes connected by the edge comprises computing mutual information for each combination of a metric of the dependent node and a metric of the independent node connected by the edge.

5. The process of claim 2 wherein computing mutual information for each metric and alert combination at the nodes connected by the edge comprises:
computing mutual information for each combination of a metric and alert of the dependent node; and
computing mutual information for each combination of a metric and alert of the independent node.

6. The process of claim 2 wherein computing mutual information for each pair of alerts across the dependent and independent nodes connected by the edge comprises computing mutual information for each combination of alerts at the dependent node and alerts at the independent node connected by the edge.

7. The process of claim 1 wherein identifying the root cause of the performance problem comprises:
identifying each node of the dependency graph with mutual information that is greater than a mutual information threshold as a potential root cause of the problem;
identifying a last node of a chain of nodes of a path in the dependency graph with mutual information greater than the mutual information threshold as the root cause of the performance problem; and
identifying the performance error as a software error at the application when none of the other nodes of the dependency graph has mutual information greater than the mutual information threshold.

8. A computer system for performing automated troubleshooting a network used by an application running in a data center, the system comprising:
one or more processors;
one or more data-storage devices; and
machine-readable instructions stored in the one or more data-storage devices that when executed using the one or more processors controls the system to perform operations comprising:
constructing a dependency graph as a model of the network of entities of the data center that send data to and receive data from the application, wherein nodes of the dependency graph represent the application and the entities of the network;
monitoring a key performance indicator ("KPI") of the application for a performance problem with the application;
displaying a graphical user interface that enables a user to select troubleshoot the application in response to a performance problem that has been detected in the KPI;
in response to a user selecting troubleshoot the application, traversing the dependency graph to detect nodes with problems that are correlated with a performance problem detected with the application by identifying anomalous points and change points in metrics of each node and identifying correlated combinations of metrics and alerts for each edge of the dependency graph;
identifying a root cause of the performance problem as created by a node of the dependency graph as one of a manual configuration error, a hardware error, and a software error based on the nodes with metrics and alerts that are correlated with the performance problem; and
displaying in a graphical user interface the dependency graph with the path of nodes leading to a last node highlighted and an alert that categorizes the root cause of the problem at the last no& as a manual configuration error, a hardware error, or a software error.

9. The computer system of claim 8 wherein traversing the dependency graph to detect nodes with problems that are correlated with the performance problem comprises;
for each metric of each node of the dependency graph,
computing a moving average of run-time metric values of the metric in a sliding time window,
computing a moving standard deviation of the run-time metric values of the metric in the sliding time window,
computing a Score for the run-time metric values of the metric in the sliding time window based on the moving average and the moving standard deviation,
detecting anomalous points of metric based on the Score,
computing a T-value of the run-time metric values in the sliding time window, and
detecting change points in the sliding time window by applying a Student T-test to the T-value.

10. The computer system of claim 8 wherein traversing the dependency graph to detect nodes with problems that are correlated with the performance problem comprises:
for each edge of the dependency graph,
computing mutual information for each pair of metrics across dependent and independent nodes connected by the edge,
computing mutual information for each metric and alert combination at the dependent node and at the independent node connected by the edge, and
computing mutual information for each pair of alerts across the dependent and independent nodes connected by the edge.

11. The computer system of claim 10 wherein computing mutual information for each pair of metrics across the dependent and independent nodes connected by the edge comprises computing mutual information for each combination of a metric of the dependent node and a metric of the independent node connected by the edge.

12. The computer system of claim 10 wherein computing mutual information for each metric and alert combination at the nodes connected by the edge comprises:
computing mutual information for each combination of a metric and alert of the dependent node; and computing mutual information for each combination of a metric and alert of the independent node.

13. The computer system of claim 10 wherein computing mutual information for each pair of alerts across the dependent and independent nodes connected by the edge comprises computing mutual information for each combination of alerts at the dependent node and alerts at the independent node connected by the edge.

14. The computer system of claim 8 wherein identifying a root cause of the performance problem comprises:
identifying each node of the dependency graph with mutual information between metrics and alerts being greater than a mutual information threshold as a potential source of the problem;
identifying a last node of a chain of nodes of a path in the dependency graph with mutual information greater than the mutual information threshold as the root cause of the performance problem; and
identifying the performance error as a software error at the application when none of the other nodes of the dependency graph has mutual information greater than the mutual information threshold.

15. A non-transitory computer-readable medium encoded with machine-readable instructions that when executed by one or more processors of a computer system cause the computer system to perform operations comprising:
constructing a dependency graph as a model of the network of entities of the data center that send data to and receive data from the application, wherein nodes of the dependency graph represent the application and the entities of the network;
monitoring a key performance indicator ("KPI") of the application to detect a performance problem with the application;
traversing the dependency graph to detect nodes with problems that are correlated with the performance problem detected in the KPI by identifying anomalous points and change points in metrics of each node and identifying correlated combinations of metrics and alerts for each edge of the dependency graph;
identifying a root cause of the performance problem as created by a node of the dependency graph as one of a manual configuration error, a hardware error, and a software error based on the nodes with metrics and alerts that are correlated with the performance problem; and
displaying in a graphical user interface the dependency graph with the path of nodes leading to a last node highlighted and an alert that categorizes the root cause of the problem at the last node as a manual configuration error, a hardware error, or a software error.

16. The medium of claim 15 wherein traversing the dependency graph to detect nodes with problems that are correlated with the performance problem comprises:
for each metric of each node of the dependency graph,
computing a moving average of run-time metric values of the metric in a sliding time window,
computing a moving standard deviation of the run-time metric values of the metric in the sliding time window,
computing a Score for the run-time metric values of the metric in the sliding time window based on the moving average and the moving standard deviation,
detecting anomalous points of the metric based on the Score,
computing a T-value of the run-time metric values in the sliding time window, and
detecting change points in the sliding time window by applying a Student T-test to the T-value.

17. The medium of claim 15 wherein traversing the dependency graph to detect nodes with problems that are correlated with the performance problem comprises:
for each edge of the dependency graph,
computing mutual information for each pair of metrics across dependent and independent nodes connected by the edge,
computing mutual information for each metric and alert combination at the dependent node and at the independent node connected by the edge, and
computing mutual information for each pair of alerts across the dependent and independent nodes connected by the edge.

18. The medium of claim 17 wherein computing mutual information for each pair of metrics across the dependent and independent nodes connected by the edge comprises computing mutual information for each combination of a metric of the dependent node and a metric of the independent node connected by the edge.

19. The medium of claim 17 wherein computing mutual information for each metric and alert combination at the nodes connected by the edge comprises:
computing mutual information for each combination of a metric and alert of the dependent node; and
computing mutual information for each combination of a metric and alert of the independent node.

20. The medium of claim 17 wherein computing mutual information for each pair of alerts across the dependent and independent nodes connected by the edge comprises computing mutual information for each combination of alerts at the dependent node and alerts at the independent node connected by the edge.

21. The medium of claim 15 wherein identifying the root cause of the performance problem comprises:
identifying each node of the dependency graph with mutual information between metrics and alerts being greater than a mutual information threshold as a potential source of the problem:
identifying a last node of a chain of nodes of a path in the dependency graph with mutual information greater than the mutual information threshold as the root cause of the performance problem; and
identifying the performance error as a software error at the application when none of the other nodes of the dependency graph has mutual information greater than the mutual information threshold.

* * * * *